US010953882B2

United States Patent
Fujii

(10) Patent No.: US 10,953,882 B2
(45) Date of Patent: Mar. 23, 2021

(54) STEERING ASSIST SYSTEM

(71) Applicant: TOYOTA JIDOSHA KABUSHIKI KAISHA, Toyota (JP)

(72) Inventor: Shota Fujii, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 297 days.

(21) Appl. No.: 15/997,044

(22) Filed: Jun. 4, 2018

(65) Prior Publication Data

US 2018/0345978 A1 Dec. 6, 2018

(30) Foreign Application Priority Data

Jun. 6, 2017 (JP) ............................. JP2017-111675

(51) Int. Cl.
| | |
|---|---|
| *B60W 30/18* | (2012.01) |
| *B62D 15/02* | (2006.01) |
| *B60W 30/12* | (2020.01) |
| *B60W 30/16* | (2020.01) |
| *B60W 40/105* | (2012.01) |
| *B60W 30/095* | (2012.01) |

(Continued)

(52) U.S. Cl.
CPC ... *B60W 30/18163* (2013.01); *B62D 15/0255* (2013.01); *B62D 15/0265* (2013.01); *B60W 30/0953* (2013.01); *B60W 30/0956* (2013.01); *B60W 30/12* (2013.01); *B60W 30/16* (2013.01); *B60W 40/105* (2013.01); *B60W 2420/52* (2013.01); *G05D 1/0088* (2013.01); *G05D 1/0214* (2013.01); *G05D 1/0223* (2013.01); *G08G 1/166* (2013.01); *G08G 1/167* (2013.01)

(58) Field of Classification Search
CPC .......... B60W 30/18163; B60W 30/12; B60W 30/16; B60W 40/105; B60W 2420/52; B60W 30/0953; B60W 30/0956; B60W 10/20; B60W 2050/046; B60W 30/08; B60W 30/095; B60W 30/18145; B62D 15/0265; B62D 15/0255; G08G 1/166; G08G 1/167; G05D 1/0223; G05D 1/0088; G05D 1/0214
USPC ...................................................... 701/301
See application file for complete search history.

(56) References Cited

U.S. PATENT DOCUMENTS

| | | |
|---|---|---|
| 2005/0270145 A1 | 12/2005 | Kataoka et al. |
| 2006/0025918 A1 | 2/2006 | Saeki |

(Continued)

FOREIGN PATENT DOCUMENTS

| | | |
|---|---|---|
| JP | 2006-315491 A | 11/2006 |
| JP | 2007261452 A | 10/2007 |

(Continued)

*Primary Examiner* — Jonathan M Dager
*Assistant Examiner* — Jean W Charleston
(74) *Attorney, Agent, or Firm* — Sughrue Mion, PLLC

(57) ABSTRACT

A steering assist system includes: a first sensor; a second sensor; and an electronic control unit. The electronic control unit is configured to start a lane change assist control when another vehicle obstructing a lane change is detected; detect a progress status of the lane change; stop the lane change assist control, when the first sensor detects an approaching vehicle; execute a center return assist control when the lane change assist control is stopped in a former part of the lane change; and execute a collision avoidance assist control when the lane change assist control is stopped in a latter part of the lane change.

11 Claims, 15 Drawing Sheets

(51) Int. Cl.
  *G05D 1/02* (2020.01)
  *G08G 1/16* (2006.01)
  *G05D 1/00* (2006.01)

(56) References Cited

U.S. PATENT DOCUMENTS

| | | | |
|---|---|---|---|
| 2007/0233386 A1 | 10/2007 | Saito et al. | |
| 2008/0086241 A1* | 4/2008 | Phillips | G05D 1/0038 |
| | | | 701/2 |
| 2008/0097699 A1* | 4/2008 | Ono | B62D 15/0265 |
| | | | 701/300 |
| 2008/0319612 A1* | 12/2008 | Kudo | B62D 15/025 |
| | | | 701/42 |
| 2009/0187313 A1* | 7/2009 | Kawakami | B62D 15/029 |
| | | | 701/45 |
| 2010/0030426 A1* | 2/2010 | Okita | B60W 40/072 |
| | | | 701/41 |
| 2013/0226432 A1* | 8/2013 | Tsuruta | B60W 30/165 |
| | | | 701/96 |
| 2014/0236414 A1* | 8/2014 | Droz | G08G 1/166 |
| | | | 701/28 |
| 2015/0251656 A1* | 9/2015 | Yester | B60W 10/20 |
| | | | 701/41 |
| 2016/0001776 A1* | 1/2016 | Kim | B60W 30/16 |
| | | | 701/96 |
| 2016/0107687 A1* | 4/2016 | Yamaoka | B62D 15/0255 |
| | | | 701/41 |
| 2016/0313738 A1 | 10/2016 | Kindo et al. | |
| 2017/0166254 A1* | 6/2017 | Katoh | B62D 6/005 |
| 2017/0341652 A1 | 11/2017 | Sugawara et al. | |
| 2017/0369072 A1* | 12/2017 | Huber | B60W 50/14 |
| 2018/0154939 A1 | 6/2018 | Aoki | |
| 2018/0188735 A1 | 7/2018 | Sugawara et al. | |
| 2018/0215387 A1* | 8/2018 | Takae | B60W 30/18163 |
| 2018/0215389 A1 | 8/2018 | Takae | |

FOREIGN PATENT DOCUMENTS

| | | |
|---|---|---|
| JP | 2008-195402 A | 8/2008 |
| JP | 4172434 B2 | 10/2008 |
| JP | 2009-190464 A | 8/2009 |
| JP | 4349210 B2 | 10/2009 |
| JP | 2010-006279 A | 1/2010 |
| JP | 4929777 B2 | 5/2012 |
| JP | 2014-148293 A | 8/2014 |
| JP | 2016-126360 A | 7/2016 |
| JP | 2016203882 A | 12/2016 |
| JP | 2017033060 A | 2/2017 |
| JP | 2017065420 A | 4/2017 |
| WO | 2016/135049 A1 | 9/2016 |
| WO | 2017/017793 A1 | 2/2017 |
| WO | 2017017796 A1 | 2/2017 |

* cited by examiner

STEERING ASSIST SYSTEM

INCORPORATION BY REFERENCE

The disclosure of Japanese Patent Application No. 2017-111675 filed on Jun. 6, 2017 including the specification, drawings and abstract is incorporated herein by reference in its entirety.

BACKGROUND

1. Technical Field

The disclosure relates to a steering assist system.

2. Description of Related Art

There is known a steering assist system that executes a control (referred to as a lane change assist control) of assisting a steering operation such that an own vehicle performs a lane change from a previous lane on which the own vehicle is currently traveling, to an adjacent lane. For example, a vehicle control system proposed in Japanese Patent Application Publication No. 2016-126360 (JP 2016-126360 A) is configured to monitor the periphery of the own vehicle, to determine whether there is another vehicle that obstructs the lane change assist control, and not to start the lane change assist control in a situation where there is another vehicle as an obstacle.

SUMMARY

However, even when the lane change assist control is permitted and started based on the periphery monitoring, there can be a case where another vehicle abnormally approaches the own vehicle after that. As shown in FIG. 16, examples of the case include a case where another vehicle C2 rapidly approaches an own vehicle C1 from the back on an adjacent lane as a lane change target (referred to as a target lane) at an unexpected relative velocity, and a case where another vehicle C3 enters the target lane from a lane that is further adjacent to the target lane (a lane that is two lanes away from the previous lane) and abnormally approaches the own vehicle C1. In the system proposed in JP 2016-126360 A, the case where the other vehicle abnormally approaches the own vehicle after the lane change assist control is started is not considered, so that it is not possible to cope with the case.

For example, the lane change assist control can be stopped in the case of detecting that the other vehicle abnormally approaches the own vehicle during the lane change assist control. However, in a mere stop of the lane change assist control, there is a room for improvement about convenience and safety.

The disclosure provides a steering assist system in which convenience and safety are increased.

An aspect of the disclosure provides a steering assist system. The steering assist system according to the aspect includes: a first sensor configured to monitor a periphery of an own vehicle; a second sensor configured to recognize a lane, and acquire lane information including a positional relation of the own vehicle relative to the lane; and an electronic control unit configured to start a lane change assist control in response to a lane change assist request, in a case where the first sensor does not detect another vehicle obstructing a lane change performed by the own vehicle, the lane change assist control controlling steering such that the own vehicle performs the lane change, based on the lane information, from a previous lane to a target lane, the previous lane being a lane on which the own vehicle is currently traveling, the target lane being a lane adjacent to the previous lane, detect a progress status of the lane change by the lane change assist control at a current time point, stop the lane change assist control halfway, when the first sensor detects an approaching vehicle, that the approaching vehicle being likely to abnormally approach the own vehicle in a case where the lane change assist control is continued, execute a center return assist control in a case where the progress status when the approaching vehicle is detected and the lane change assist control is stopped halfway is a former part of the lane change, the center return assist control controlling the steering such that the own vehicle is moved to a center position of the previous lane in a lane width direction of the previous lane, and execute a collision avoidance assist control in a case where the progress status when the approaching vehicle is detected and the lane change assist control is stopped halfway is a latter part of the lane change, the collision avoidance assist control controlling an orientation of the own vehicle such that a yaw angle is decreased at an emergency velocity, the yaw angle being an angle between a direction in which the lane extends and an orientation direction of the own vehicle, the emergency velocity being higher than a velocity at which the yaw angle is changed by the center return assist control.

According to the above configuration, it is possible to acquire the positional relation of the own vehicle relative to the lane by recognizing the lane. Also, the own vehicle can perform the lane change to the target lane, without requiring driver's wheel operation. Even when the lane change assist control is permitted and started based on the periphery monitoring, there can be a case where the other vehicle abnormally approaches the own vehicle after that. According to the above configuration, it is possible to secure safety, and further to move the own vehicle to a preferable position for the driver (the center position of the previous lane). Also, it is possible to quickly prevent the own vehicle from moving to the width-directional center side of the target lane, and it is possible to assist the avoidance of collision with the approaching vehicle (to assist the decrease in probability of the collision). As a result, it is possible to increase convenience and safety.

In the aspect, the electronic control unit may be configured to execute a lane tracing assist control, the lane tracing assist control controlling the steering such that a traveling position of the own vehicle is kept at a regular position in the lane width direction in the lane based on the lane information, stop the lane tracing assist control, start the lane change assist control, in a case where the lane change assist request is received while the lane tracing assist control is being executed, and control the steering such that the yaw angle increased by the lane change assist control is returned to a previous yaw angle immediately before the lane change assist control is started.

According to the above configuration, it is possible to decrease the lateral velocity that is the velocity of the own vehicle in the lane width direction, in a short time. Thereby, it is possible to quickly prevent the own vehicle from moving to the width-directional center side of the target lane.

In the aspect, the electronic control unit may be configured to compute a first target controlled variable in a predetermined computation cycle, the first target controlled variable including a feedforward controlled variable in which a target curvature of a track in which the own vehicle performs the lane change is used, control the steering based on the first target controlled variable, compute a value corresponding to an integrated value of the target curvature from start of the lane change assist control to start of the collision avoidance assist control, compute a second target controlled variable based on the value corresponding to the integrated value, and control the steering based on the second target controlled variable while the collision avoidance assist control is executed.

According to the above configuration, it is possible to quickly decrease the lateral velocity that is the velocity of the own vehicle in the lane width direction.

In the aspect, the electronic control unit may be configured to execute a previous lane return assist control after the collision avoidance assist control is completed, the previous lane return assist control controlling the steering such that the own vehicle is moved to the center position of the previous lane in the lane width direction of the previous lane.

According to the above configuration, the steering is controlled such that the own vehicle is returned to the center position of the previous lane in the lane width direction of the previous lane. Accordingly, it is possible to return the own vehicle to a position (the center position of the previous lane) that is further safe and that is preferable for the driver.

In the aspect, the electronic control unit may be configured to determine whether the progress status of the lane change by the lane change assist control at the current time point is the former part of the lane change or the latter part of the lane change, determine that the progress status is the former part of the lane change in a case where it is estimated that the own vehicle is positioned in the previous lane, and determine that the progress status is the latter part of the lane change in a case where it is estimated that at least a part of the own vehicle is positioned in the target lane.

According to the above configuration, it is possible to properly determine whether the progress status is the former part of the lane change or the latter part of the lane change.

In the aspect, the electronic control unit may be configured to determine whether the progress status of the lane change by the lane change assist control at the current time point is the former part of the lane change or the latter part of the lane change, determine that the progress status is the former part of the lane change in a case where it is estimated that the own vehicle is positioned in a first area that is on an opposite side of a determination position from the target lane in a lane change direction, and determine that the progress status is the latter part of the lane change in a case where it is estimated that the own vehicle is positioned in a second area that is on an opposite side of the determination position from the first area in the lane change direction, the determination position being a particular position located between the center position of the previous lane in the lane width direction of the previous lane and a boundary, the boundary being between the previous lane and the target lane.

According to the above configuration, it is possible to prevent a part of the own vehicle from being on the target lane in the case where the center return assist control is executed. Accordingly, it is possible to perform the determination of the former part and latter part of the lane change more properly.

In the aspect, the electronic control unit may be configured to set the determination position such that a distance between the boundary and the determination position is longer as a velocity of the own vehicle in the lane width direction is higher.

According to the above configuration, it is possible to perform the determination of the former part and latter part of the lane change more properly.

In the aspect, the electronic control unit may be configured to determine that the approaching vehicle is detected, when an approach degree of another vehicle to the own vehicle exceeds a threshold, and the threshold is set to a value corresponding to a higher approach degree in the latter part of the lane change than in the former part of the lane change.

As the approach degree, for example, a predicted value (predicted time) from the current time point to the collision between the own vehicle and the other vehicle may be used. The threshold may be set to a value corresponding to a higher approach degree in the latter part of the lane change than in the former part of the lane change. Therefore, according to the above configuration, in the former part of the lane change, it is possible to end the lane change assist control with enough time in a state where safety is sufficiently secured, in the case of detecting the approaching vehicle that is likely to abnormally approach the own vehicle. On the other hand, in the latter part of the lane change, it is possible to prevent the collision avoidance assist control from being executed more than necessary. That is, in the latter part of the lane change, it is possible to prevent the lane change assist control from being stopped halfway more than necessary, and it is possible to increase convenience.

The constituents of the disclosure are not limited to the embodiments specified by reference numerals.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, a steering assist system according to an embodiment of the disclosure will be described with reference to the drawings.

Figure 1:
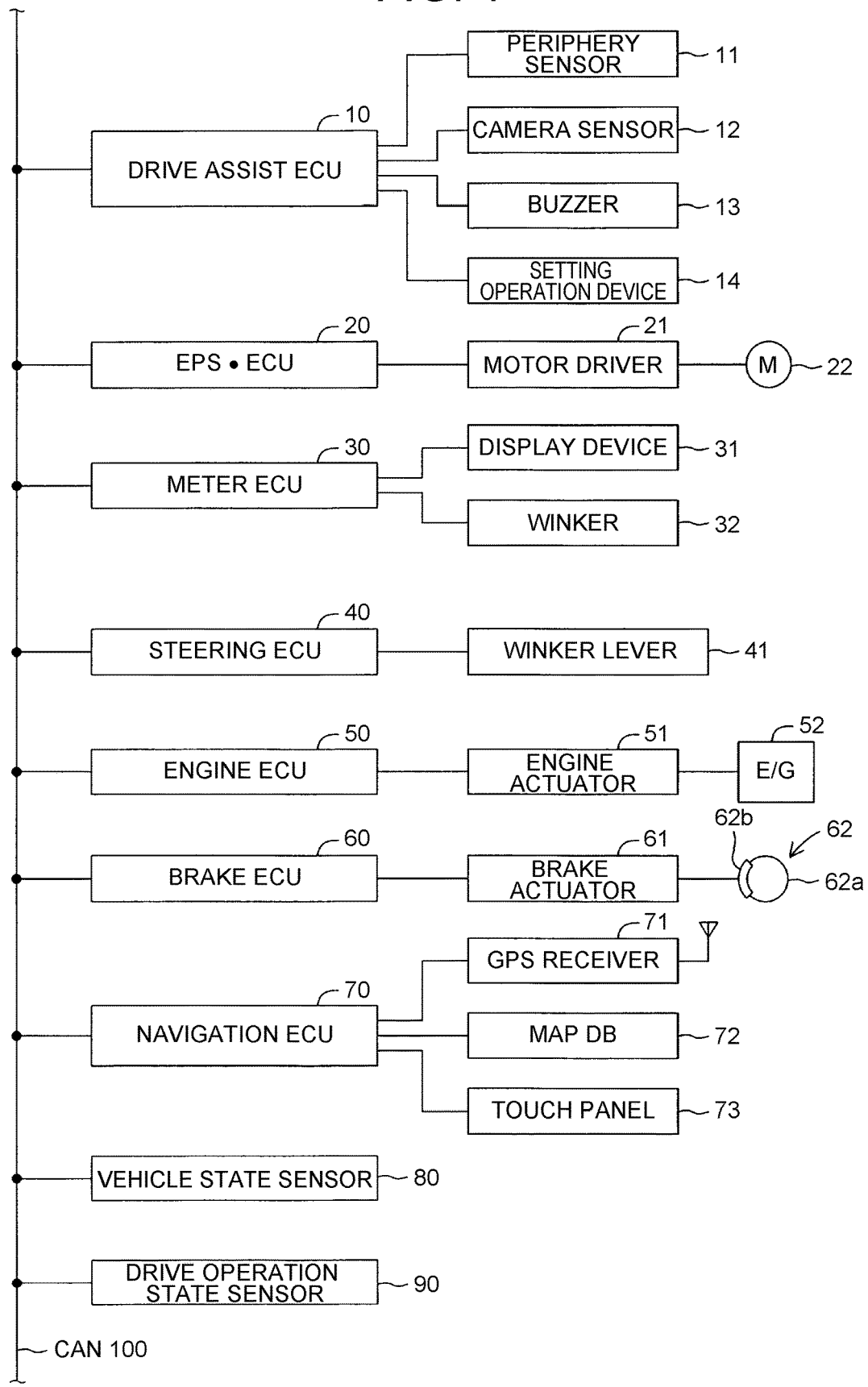
FIG. 1 is a schematic block diagram of a steering assist system according to an embodiment of the disclosure.

A steering assist system according to an embodiment of the disclosure is applied to a vehicle (hereinafter, also referred to as an "own vehicle" for distinction from another vehicle). As shown in FIG. 1, the steering assist system includes a drive assist ECU 10, an electric power steering ECU 20, a meter ECU 30, a steering ECU 40, an engine ECU 50, a brake ECU 60, and a navigation ECU 70.

These ECUs are electric control units each of which includes a microcomputer as a main part, and are connected with each other through a controller area network (CAN) 100, such that information can be mutually sent and received. In the present specification, the microcomputer includes a CPU, a ROM, a RAM, a non-volatile memory, an interface I/F, and the like. The CPU realizes various functions by executing instructions (programs or routines) stored in the ROM. Some or all of the ECUs may be integrated in a single ECU.

The CAN 100 is connected with multiple kinds of vehicle state sensors 80 that detect vehicle states and multiple kinds of drive operation state sensors 90 that detect drive operation state. The vehicle state sensors 80 include a speed sensor that detects the traveling velocity of the vehicle, a front-rear G sensor that detects the acceleration of the vehicle in the front-rear direction, a lateral G sensor that detects the acceleration of the vehicle in the lateral direction, a yaw rate sensor that detects the yaw rate of the vehicle, and the like.

The drive operation state sensors 90 include an accelerator operation amount sensor that detects the operation amount of an accelerator pedal, a brake operation amount sensor that detects the operation amount of a brake pedal, a brake switch that detects whether the brake pedal has been operated, a steering angle sensor that detects steering angle, a steering torque sensor that detects steering torque, a shift position sensor that detects the shift position of a transmission, and the like.

Information (referred to as sensor information) detected by the vehicle state sensors 80 and the drive operation state sensors 90 is sent to the CAN 100. Each ECU can use the sensor information sent to the CAN 100, when appropriate. In some cases, the sensor information is information from a sensor connected with a particular ECU, and is sent from the particular ECU to the CAN 100. For example, the accelerator operation amount sensor may be connected with the engine ECU 50. In this case, sensor information indicating the accelerator operation amount is sent from the engine ECU 50 to the CAN 100. For example, the steering angle sensor may be connected with the steering ECU 40. In this case, sensor information indicating the steering angle is sent from the steering ECU 40 to the CAN 100. The same goes for the other sensors. It is allowable to employ a configuration in which the sensor information is exchanged by a direct communication between particular ECUs, without the CAN 100.

Figure 2:
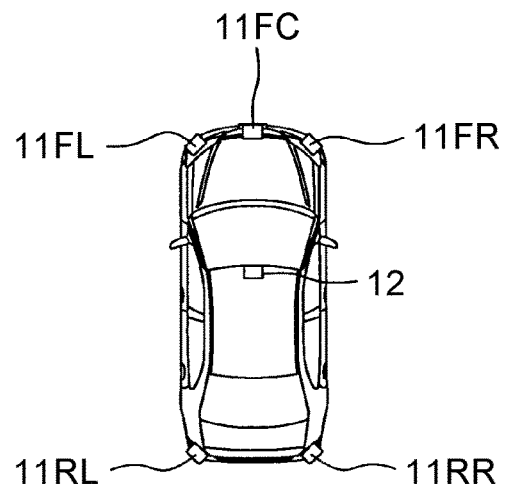
FIG. 2 is a plan view showing attachment positions of a periphery sensor and a camera sensor.

The drive assist ECU 10 is a control device that mainly performs drive assist for a driver, and executes a lane change assist control, a lane tracing assist control and an adaptive cruise control. As shown in FIG. 2, the drive assist ECU 10 is connected with a center front periphery sensor 11FC, a right front periphery sensor 11FR, a left front periphery sensor 11FL, a right rear periphery sensor 11RR, and a left rear periphery sensor 11RL. The periphery sensors 11FC, 11FR, 11FL, 11RR, 11RL, which are radar sensors, are different from each other only in detection region, and basically have the same configuration as each other. Hereinafter, each of the periphery sensors 11FC, 11FR, 11FL, 11RR, 11RL is referred to as a periphery sensor 11, when it is not necessary to individually distinguish them.

The periphery sensor 11 includes a radar sending-receiving unit and a signal processing unit (not illustrated). The radar sending-receiving unit radiates an electric wave with a millimeter waveband (hereinafter, referred to as a "millimeter wave"), and receives a millimeter wave (reflected wave) reflected by a three-dimensional object (for example, another vehicle, a pedestrian, a bicycle, and a building) that exists in a radiation range. The signal processing unit acquires information (hereinafter, referred to as periphery information) indicating the distance between the own vehicle and the three-dimensional object, the relative velocity between the own vehicle and the three-dimensional object, the relative position (direction) of the three-dimensional object to the own vehicle, and the like, based on the phase difference between the sent millimeter wave and the received reflected wave, the attenuation level of the reflected wave, the time from the sending of the millimeter wave to the receiving of the reflected wave, and the like, and supplies the information to the drive assist ECU 10, whenever a predetermined time elapses. From the periphery information, it is possible to detect a front-rear directional component and lateral directional component of the distance between the own vehicle and the three-dimensional object, and a front-rear directional component and lateral directional component of the relative velocity between the own vehicle and the three-dimensional object.

As shown in FIG. 2, the center front periphery sensor 11FC, which is provided at a center portion of the front of a vehicle body, detects a three-dimensional object that exists in a forward region from the own vehicle. The right front periphery sensor 11FR, which is provided at a right front corner portion of the vehicle body, detects mainly a three-dimensional object that exists in a right forward region from the own vehicle. The left front periphery sensor 11FL, which is provided at a left front corner portion of the vehicle body, detects mainly a three-dimensional object that exists in a left forward region from the own vehicle. The right rear periphery sensor 11RR, which is provided at a right rear corner portion of the vehicle body, detects mainly a three-dimensional object that exists in a right rearward region from the own vehicle. The left rear periphery sensor 11RL, which is provided at a left rear corner portion of the vehicle body, detects mainly a three-dimensional object that exists in a left rearward region from the own vehicle.

In the embodiment, the periphery sensor 11 is a radar sensor, but another sensor such as, for example, a clearance sonar and a LIDAR sensor may be employed instead of the radar sensor.

Further, the drive assist ECU 10 is connected with a camera sensor 12. The camera sensor 12 includes a camera unit and a lane recognition unit that analyzes image data photographed and obtained by the camera unit and recognizes a white line on a road. The camera sensor 12 (camera unit) photographs a sight in front of the own vehicle. The camera sensor 12 (lane recognition unit) repeatedly supplies information about the recognized white line, to the drive assist ECU 10, in a predetermined computation cycle.

The camera sensor 12 can recognize a lane showing a region demarcated by white lines, and can detect the positional relation of the own vehicle relative to the lane, based on the positional relation between the white lines and the own vehicle. The lane is a region that is demarcated by white lines, for example. The position of the own vehicle is the position of the center of gravity of the own vehicle. Further, a lateral position of the own vehicle described later means the position of the center of gravity of the own vehicle in a lane width direction, a lateral velocity of the own vehicle means the velocity of the center of gravity of the own vehicle in the lane width direction, and a lateral acceleration of the own vehicle means the acceleration of the center of gravity of the own vehicle in the lane width direction. They can be evaluated from the positional relation of the own vehicle relative to the white lines detected by the camera sensor 12. In the embodiment, the position of the own vehicle is the position of the center of gravity, but is not necessarily limited to the position of the center of gravity, and a preset particular position (for example, a center position in planar view) can be employed.

Figure 3:
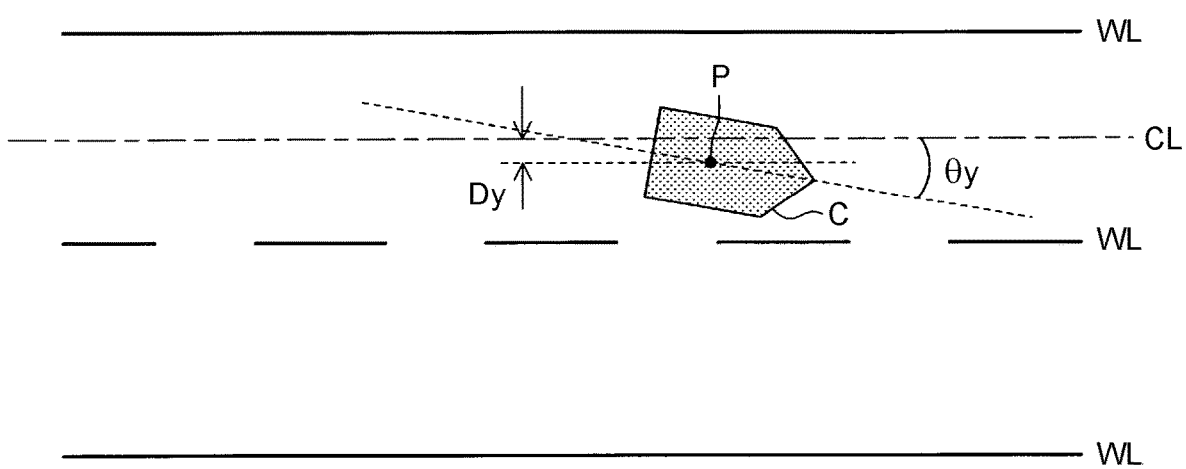
FIG. 3 is a diagram for describing lane-related vehicle information.

As shown in FIG. 3, the camera sensor 12 determines a lane center line CL at a width-directional center position between right and left white lines WL for a lane on which the own vehicle is traveling. The lane center line CL is used as a target traveling line in a lane tracing assist control described later. Further, the camera sensor 12 computes a curvature Cu of a curve of the lane center line CL.

The camera sensor 12 computes the position and orientation of the own vehicle on the lane demarcated by the right and left white lines WL. For example, as shown in FIG. 3, the camera sensor 12 computes a distance Dy (m) in the lane width direction between a gravity center point P of an own vehicle C and the lane center line CL, that is, a distance Dy by which an own vehicle C deviates from the lane center line CL in the lane width direction. The distance Dy is referred to as a lateral deviation Dy. Further, the camera sensor 12 computes an angle between the direction of the lane center line CL and the orientation direction of the own vehicle C, that is, an angle θy (rad) by which the orientation direction of the own vehicle C horizontally deviates from the direction of the lane center line CL. The angle θy is referred to as a yaw angle θy. In the case where the lane is curved, the lane center line CL is also curved. The yaw angle θy means an angle by which the orientation direction of the own vehicle C deviates from the curved lane center line CL. Also, the lane center line CL is along a direction in which the lane extends. Hereinafter, information (Cu, Dy, θy) indicating the curvature Cu, the lateral deviation Dy and the yaw angle θy is referred to as lane-related vehicle information. As for the lateral deviation Dy and the yaw angle θy, the right direction or left direction with respect to the lane center line CL is specified by the signs (positive or negative). As for the curvature Cu, the curved direction (right direction or left direction) is specified by the sign (positive or negative).

For not only the lane of the own vehicle but also an adjacent lane, the camera sensor 12 supplies, to the drive assist ECU 10, information about white lines, as exemplified by the kind (a solid line, a broken line) of a detected white line, the distance (lane width) between right and left white lines adjacent to each other, the form of the white line, in a predetermined computation cycle. In the case where the white line is a solid line, the vehicle is prohibited from performing a lane change across the white line. On the other hand, in the case where the white line is a broken line (the white line is formed intermittently at a regular interval), the vehicle is permitted to perform the lane change across the white line. The lane-related vehicle information (Cu, Dy, θy) and the information about the white line are collectively referred to as lane information.

In the embodiment, the camera sensor 12 computes the lane-related vehicle information (Cu, Dy, θy), but instead, the drive assist ECU 10 may analyze the image data output by the camera sensor 12, and may acquire the lane information.

The camera sensor 12 can detect a three-dimensional object that exists in front of the own vehicle, based on the image data, and therefore, may acquire front periphery information by computation, in addition to the lane information. In this case, for example, the steering assist system may be provided with a synthesis processing unit (not illustrated) that synthesizes the periphery information acquired by the center front periphery sensor 11FC, the right front periphery sensor 11FR and the left front periphery sensor 11FL and the periphery information acquired by the camera sensor 12 and generates front periphery information with a high detection accuracy, and may supply the front periphery information generated by the synthesis processing unit, to the drive assist ECU 10, as the front periphery information of the own vehicle.

As shown in FIG. 1, the drive assist ECU 10 is connected with a buzzer 13. The buzzer 13 sounds when receiving a buzzer sounding signal from the drive assist ECU 10. For example, in the case where the drive assist ECU 10 informs the driver of a drive assist status or calls driver's attention, the drive assist ECU 10 makes the buzzer 13 sound.

In the embodiment, the buzzer 13 is connected with the drive assist ECU 10, but may be connected with another ECU, for example, a notification ECU (not illustrated) that is provided only for notification, and may be configured to sound through the notification ECU. In this case, the drive assist ECU 10 sends a buzzer sounding command to the notification ECU.

Instead of or in addition to the buzzer 13, a vibrator that gives a vibration for calling driver's attention may be provided. For example, the vibrator is provided in a steering wheel, and calls driver's attention by vibrating the steering wheel.

The drive assist ECU 10 executes the lane change assist control, the lane tracing assist control and the adaptive cruise control, based on the periphery information supplied from the periphery sensor 11, the lane information obtained based on the white line recognition by the camera sensor 12, the vehicle state detected by the vehicle state sensors 80, the drive operation state detected by the drive operation state sensor 90, and the like.

The drive assist ECU 10 is connected with a setting operation device 14 that is operated by the driver. The setting operation device 14 is an operation device for individually setting whether to execute the lane change assist control, whether to execute the lane tracing assist control, whether to execute the adaptive cruise control, and the like. The drive assist ECU 10 determines whether to execute the controls, by inputting setting signals to the setting operation device 14. In this case, when the execution of the adaptive cruise control is not selected, an automatic setting is performed such that the lane change assist control and the lane tracing assist control are also not executed. Further, when the execution of the lane tracing assist control is not selected, an automatic setting is performed such that the lane change assist control is not executed.

The setting operation device 14 has a function to input a parameter indicating driver's taste, and the like, in the execution of the above controls.

The electric power steering ECU 20 is a control device for an electric power steering device. Hereinafter, the electric power steering ECU 20 is referred to as the EPS ECU 20. The EPS ECU 20 is connected with a motor driver 21. The motor driver 21 is connected with a steering motor 22. The steering motor 22 is incorporated in an unillustrated "steering mechanism including a steering wheel, a steering shaft linked with the steering wheel, a steering gear mechanism, and the like" of the vehicle. The EPS ECU 20 detects a steering torque input to the steering wheel (not illustrated) by the driver, with a steering torque sensor provided in the steering shaft, and controls energization of the motor driver 21 based on the steering torque, to drive the steering motor 22. By the drive of the assist motor, the steering torque is given to the steering mechanism, and driver's steering operation is assisted.

When the EPS ECU 20 receives a steering command from the drive assist ECU 10 through the CAN 100, the EPS ECU 20 drives the steering motor 22 with a controlled variable specified by the steering command, and generates a steering torque. The steering torque means a torque that is given to the steering mechanism by the steering command from the drive assist ECU 10 without requiring the driver's steering operation (wheel operation), unlike the steering assist torque that is given for facilitating the driver's steering operation.

In the case where the steering torque by the driver's wheel operation is detected and where the steering torque is higher than a threshold, the EPS ECU 20 gives priority to the driver's wheel operation and generates the steering assist torque for facilitating the wheel operation, even when the EPS ECU 20 receives the steering command from the drive assist ECU 10.

The meter ECU 30 is connected with a display device 31 and right and left winkers 32 (each of which means a winker lamp and is also referred to as a turn lamp). The display device 31 is, for example, a multi-information display that is provided in front of a driver's seat, and displays a variety of information, in addition to measurement values of meters, as exemplified by vehicle speed. For example, when the meter ECU 30 receives a display command corresponding to a drive assist state from the drive assist ECU 10, the meter ECU 30 displays a screen designated by the display command, on the display device 31. As the display device 31, a head-up display (not illustrated) can be employed, instead of or in addition to the multi-information display. In the case where the head-up display is employed, a dedicated ECU that controls displaying on the head-up display may be provided.

The meter ECU 30 includes a winker drive circuit (not illustrated). When the meter ECU 30 receives a winker blinking command through the CAN 100, the meter ECU 30 blinks the winker 32 for a direction (right or left) designated by the winker blinking command. While the meter ECU 30 is blinking the winker 32, the meter ECU 30 sends winker blinking information indicating that the winker 32 is being blinked, to the CAN 100. Accordingly, the other ECUs can know that the winker 32 is being blinked.

The steering ECU 40 is connected with a winker lever 41. The winker lever 41 is an operation device for actuating (blinking) the winker 32, and is provided on a steering column. The winker lever 41 is provided so as to be able to swing around a spindle by a two-step stroke, in each of a left turn operation direction and a right turn operation direction.

Figure 4:
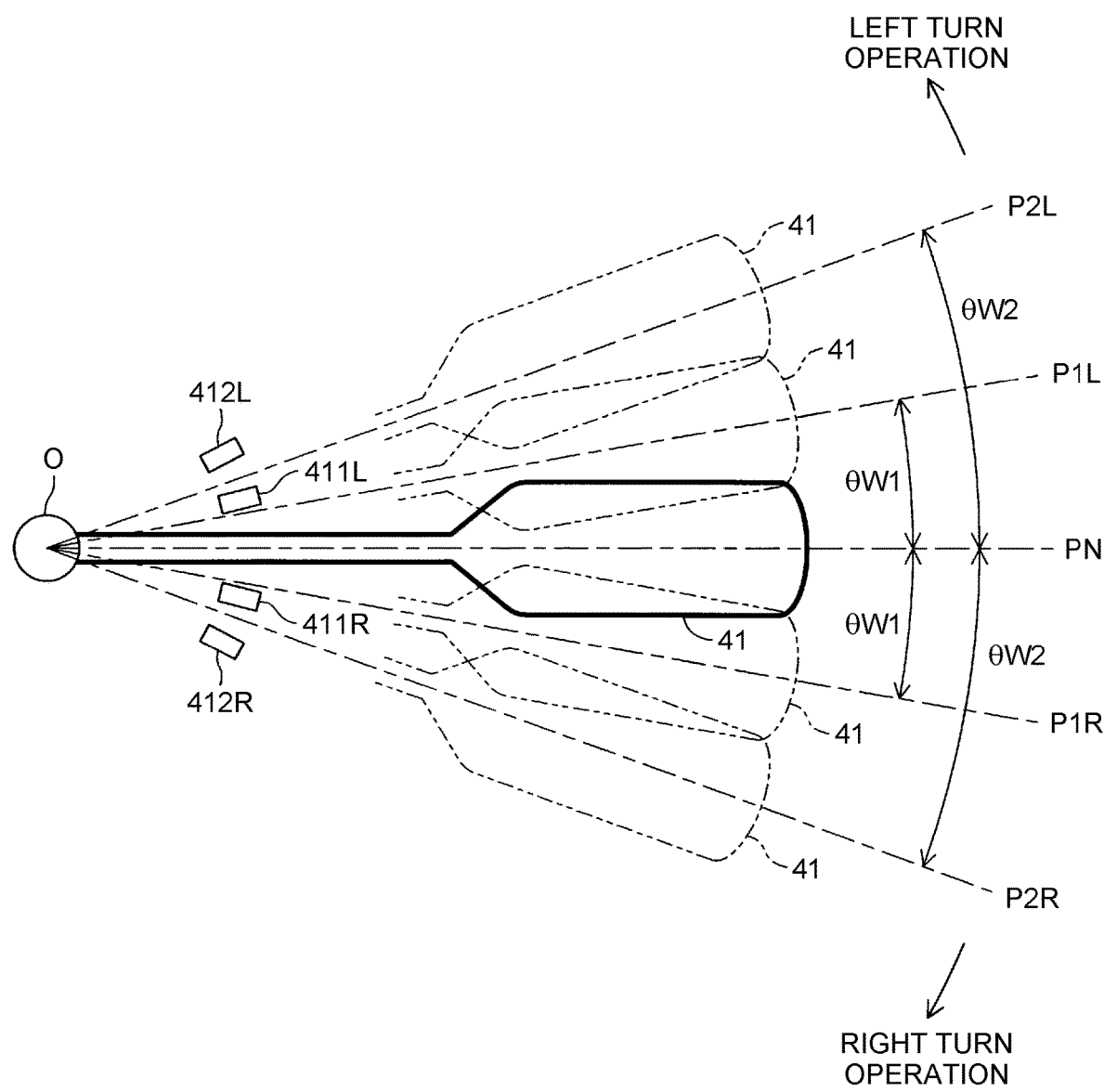
FIG. 4 is a diagram for describing operation of a winker lever.

The winker lever 41 in the embodiment is used also as an operation device through which the driver requests the lane change assist control. As shown in FIG. 4, the winker lever 41 is configured to be able to be operated selectively to a first stroke position P1L (P1R) that is a position when the winker lever 41 pivots from a neutral position PN by a first angle θW1 and a second stroke position P2L (P2R) that is a position when the winker lever 41 pivots from the neutral position PN by a second angle θW2 (>θW1), in each of a left turn operation direction and a right turn operation direction around a spindle O. In the case where the winker lever 41 is moved to the first stroke position P1L (P1R) by driver's lever operation, the winker lever 41 is returned to the neutral position PN when lever operation force from the driver is released. In the case where the winker lever 41 is moved to the second stroke position P2L (P2R) by the driver's lever operation, the winker lever 41 is kept at the second stroke position P2L (P2R) by a lock mechanism even when the lever operation force is released. In the case where the winker lever 41 is returned to the neutral position by reverse rotation of the steering wheel in a state where the winker lever 41 is kept at the second stroke position P2L (P2R), or in the case where the driver performs a return operation of the winker lever 41 in the neutral position direction, the lock by the lock mechanism is released so that the winker lever 41 is returned to the neutral position PN.

The winker lever 41 includes a first switch 411L (411R) that is turned on (that generates an on-signal) only when the position of the winker lever 41 is the first stroke position P1L (P1R), and a second switch 412L (412R) that is turned on (that generates an on-signal) only when the position of the winker lever 41 is the second stroke position P2L (P2R).

The steering ECU 40 detects the operation state of the winker lever 41, based on the on-signals from the first switch 411L (411R) and the second switch 412L (412R). In each of the case where the winker lever 41 is put to the first stroke position P1L (P1R) and the case where the winker lever 41 is put to the second stroke position P2L (P2R), the steering ECU 40 sends the winker blinking command including information that indicates the operation direction (right or left), to the meter ECU 30.

In the case where the steering ECU 40 detects that the winker lever 41 has been continuously kept at the first stroke position P1L (P1R) over a preset setting time (lane change request decision time: for example, 1 second), the steering ECU 40 outputs a lane change assist request signal including the information that indicates the operation direction (right or left), to the drive assist ECU 10. Accordingly, in the case where the driver wants the lane change assist during the driving, the driver only needs to put the winker lever 41 to the first stroke position P1L (P1R) for the lane change direction, and to keep this state over the setting time. This operation is referred to as a lane change assist request operation.

In the embodiment, the winker lever 41 is used as the operation device through which the driver requests the lane change assist, but a dedicated lane change assist request operation device may be provided on the steering wheel or the like, instead of the winker lever 41.

The engine ECU 50 shown in FIG. 1 is connected with an engine actuator 51. The engine actuator 51 is an actuator for changing the operating state of the internal combustion engine 52. In the embodiment, the internal combustion engine 52 is a gasoline-fuel-injection spark-ignition multi-cylinder engine, and includes a throttle valve for regulating an intake air amount. The engine actuator 51 includes at least a throttle valve actuator for changing the opening degree of the throttle valve. The engine ECU 50 can change torque to be generated by the internal combustion engine 52, by driving the engine actuator 51. The torque generated by the internal combustion engine 52 is transmitted to unillustrated drive wheels through an unillustrated transmission. Accordingly, by controlling the engine actuator 51, the engine ECU 50 can control drive power of the own vehicle to change an accelerating state (acceleration).

The brake ECU 60 is connected with a brake actuator 61. The brake actuator 61 is provided in a hydraulic circuit between an unillustrated master cylinder to pressurize operating fluid by depression force on the brake pedal and friction brake mechanisms 62 provided on right and left front wheels and right and left rear wheels. The friction brake mechanism 62 includes a brake disk 62a that is fixed to the wheel and a brake caliper 62b that is fixed to the vehicle body. The brake actuator 61 regulates a hydraulic pressure to be supplied to a wheel cylinder built in the brake caliper 62b, in response to an instruction from the brake ECU 60. By actuating the wheel cylinder using the hydraulic pressure, the brake actuator 61 pushes a brake pad onto the brake disk 62a, to generate friction braking power. Accordingly, by controlling the brake actuator 61, the brake ECU 60 can control the braking power of the own vehicle to change a decelerating state (deceleration).

The navigation ECU 70 includes a GPS receiver 71 that receives a GPS signal for detecting the current position of the own vehicle, a map database 72 in which map information and the like are stored, and a touch panel (touch panel display) 73. The navigation ECU 70 specifies the position of the own vehicle at the current time point based on the GPS signal, performs various computation processes based on the position of the own vehicle, the map information stored in the map database 72, and the like, and performs route guidance using the touch panel 73.

The map information stored in the map database 72 includes road information. The road information includes parameters indicating the position and form of the road (for example, the curvature radius or curvature of the road, the lane width of the road, the number of lanes, and the position of the center line of each lane). The road information also includes road type information that makes it possible to distinguish whether the road is an expressway.

Control Processes to be Performed by Drive Assist ECU 10

Next, control processes to be performed by the drive assist ECU 10 will be described. The drive assist ECU 10 executes the lane change assist control, in the case where the lane change assist request is accepted when both of the lane tracing assist control and the adaptive cruise control are being executed. Hence, first, the lane tracing assist control and the adaptive cruise control will be described.

Lane Tracing Assist Control (LTA)

The lane tracing assist control is a control of assisting the driver's steering operation by giving the steering torque to the steering mechanism such that the position of the own vehicle is maintained near the target traveling line in a "lane on which the own vehicle travels". In the embodiment, the target traveling line is the lane center line CL, but a line that is offset from the lane center line CL in the lane width direction by a predetermined distance may be employed. Accordingly, the lane tracing assist control can be expressed as a control of assisting the steering operation such that the traveling position of the own vehicle is maintained at a regular position in the lane width direction in the lane.

Hereinafter, the lane tracing assist control is referred to as LTA. Although the LTA goes by many names, the LTA itself is well known (for example, see Japanese Patent Application Publication No. 2008-195402, Japanese Patent Application Publication No. 2009-190464, Japanese Patent Application Publication No. 2010-6279, and Japanese Patent No. 4349210). Accordingly, the LTA will be briefly described below.

The drive assist ECU 10 executes the LTA, in the case where the LTA is requested by the operation of the setting operation device 14. In the case where the LTA is requested, the drive assist ECU 10 computes a target steering angle $\theta lta^*$, by the following Expression (1), based in the above-described lane-related vehicle information (Cu, Dy, $\theta y$), in a predetermined computation cycle.

$$\theta lta^* = Klta1 \cdot Cu + Klta2 \cdot \theta y + Klta3 \cdot Dy + Klta4 \cdot \Sigma Dy \qquad (1)$$

Here, Klta1, Klta2, Klta3 and Klta4 are control gains. The first member on the right side is a steering angle component that is determined depending on the curvature Cu of the road and that serves as a feedforward component. The second member on the right side is a steering angle component that serves as a feedback component so as to decrease the yaw angle $\theta y$ (so as to decrease the deviation of the direction of the own vehicle from the lane center line CL). That is, the second member on the right side is a steering angle component that is computed by a feedback control in which the target value of the yaw angle $\theta y$ is zero. The third member on the right side is a steering angle component that serves as a feedback component so as to decrease the lateral deviation Dy that is a gap (position deviation) of the position of the own vehicle in the lane width direction with respect to the lane center line CL. That is, the third member on the right side is a steering angle component that is computed by a feedback control in which the target value of the lateral deviation Dy is zero. The fourth member on the right side is a steering angle component that serves as a feedback component so as to decrease an integrated value $\Sigma Dy$ of the lateral deviation Dy. That is, the fourth member on the right side is a steering angle component that is computed by a feedback control in which the target value of the integrated value $\Sigma Dy$ is zero.

For example, in the case where the lane center line CL is curved in the left direction, in the case where the own vehicle is shifted laterally in the right direction from the lane center line CL, or in the case where the own vehicle is orientated in the right direction with respect to the lane center line CL, the target steering angle $\theta lta^*$ is set such that the target steering angle $\theta lta^*$ is a target angle in the left direction. Further, in the case where the lane center line CL is curved in the right direction, in the case where the own vehicle is shifted laterally in the left direction from the lane center line CL, or in the case where the own vehicle is orientated in the left direction with respect to the lane center line CL, the target steering angle $\theta lta^*$ is set such that the target steering angle $\theta lta^*$ is a target angle in the right direction. Accordingly, the drive assist ECU 10 executes the computation based on the above Expression (1), using signs corresponding to the left direction and the right direction respectively.

The drive assist ECU 10 outputs a command signal indicating the target steering angle $\theta lta^*$ as the computation result, to the EPS ECU 20. The EPS ECU 20 drives and controls the steering motor 22 such that the steering angle follows the target steering angle $\theta lta^*$. In the embodiment, the drive assist ECU 10 outputs the command signal indicating the target steering angle $\theta lta^*$, to the EPS ECU 20. However, the drive assist ECU 10 may compute a target torque that gives the target steering angle $\theta lta^*$, and may output a command signal indicating the target torque as the computation result, to the EPS ECU 20.

In the case where there is a fear that the own vehicle departs from the lane, the drive assist ECU 10 gives a lane departure warning, for example, by making the buzzer 13 sound. The description of an outline of the LTA has been made above.

Adaptive Cruise Control (ACC)

The adaptive cruise control is a control of making the own vehicle follow a preceding vehicle traveling in front of the own vehicle while maintaining a predetermined distance as the inter-vehicle distance between the preceding vehicle and the own vehicle in the case where the preceding vehicle exists based on the periphery information and making the own vehicle travel at a set constant vehicle speed in the case where the preceding vehicle does not exist. Hereinafter, the adaptive cruise control is referred to as ACC. The ACC itself is well known (for example, see Japanese Patent Application Publication No. 2014-148293, Japanese Patent Application Publication No. 2006-315491, Japanese Patent No. 4172434, and Japanese Patent No. 4929777). Accordingly, the ACC will be briefly described below.

The drive assist ECU 10 executes the ACC, in the case where the ACC is requested by the operation of the setting operation device 14. In the case where the ACC is requested, the drive assist ECU 10 selects a following-object vehicle, based on the periphery information supplied from the periphery sensor 11. For example, the drive assist ECU 10 determines whether another vehicle exists in a preset following-object vehicle area.

In the case where another vehicle exists in the following-object vehicle area over a predetermined time, the drive assist ECU 10 selects the other vehicle as the following-object vehicle, and sets a target acceleration such that the own vehicle follows the following-object vehicle while maintaining a predetermined inter-vehicle distance. In the case where the other vehicle does not exist in the following-object vehicle area, the drive assist ECU 10 sets the target acceleration based on the set vehicle speed and the detected vehicle speed (the vehicle speed detected by the speed sensor), such that the vehicle speed of the own vehicle coincides with the set vehicle speed.

The drive assist ECU 10 controls the engine actuator 51 using the engine ECU 50, and as necessary, controls the brake actuator 61 using the brake ECU 60, such that the acceleration of the own vehicle coincides with the target acceleration. In the case where the driver performs accelerator operation during the ACC, the drive assist ECU 10 gives priority to the accelerator operation, and does not perform an automatic deceleration control for maintaining the inter-vehicle distance between the preceding vehicle and the own vehicle. The description of an outline of the ACC has been made above.

Lane Change Assist Control (LCA)

The lane change assist control is a control of assisting the driver's steering operation (lane change operation) by giving the steering torque to the steering mechanism while monitoring the surroundings of the own vehicle, such that the own vehicle moves from a lane on which the own vehicle is currently traveling to an adjacent lane, after it is determined that the lane change can be safely performed by monitoring the surroundings of the own vehicle. Accordingly, by the lane change assist control, it is possible to change the lane on which the own vehicle travels, without requiring the driver's steering operation (wheel operation). Hereinafter, the lane change assist control is referred to as LCA.

The LCA is a control of the lateral position of the own vehicle on the lane, similarly to the LTA, and is executed instead of the LTA, in the case where the lane change assist request is accepted during the execution of the LTA and the ACC. Hereinafter, the LTA and the LCA are collectively referred to as a steering assist control, and a state of the steering assist control is referred to as a steering assist control state.

The steering assist control is a control that assists the driver's steering operation. Therefore, in the execution of the steering assist control (LTA, LCA), the drive assist ECU 10 generates steering power for the steering assist control, such that priority is given to the driver's wheel operation. Accordingly, even during the steering assist control, the driver can move the own vehicle in an intended direction, by the driver's own wheel operation.

Figure 5:
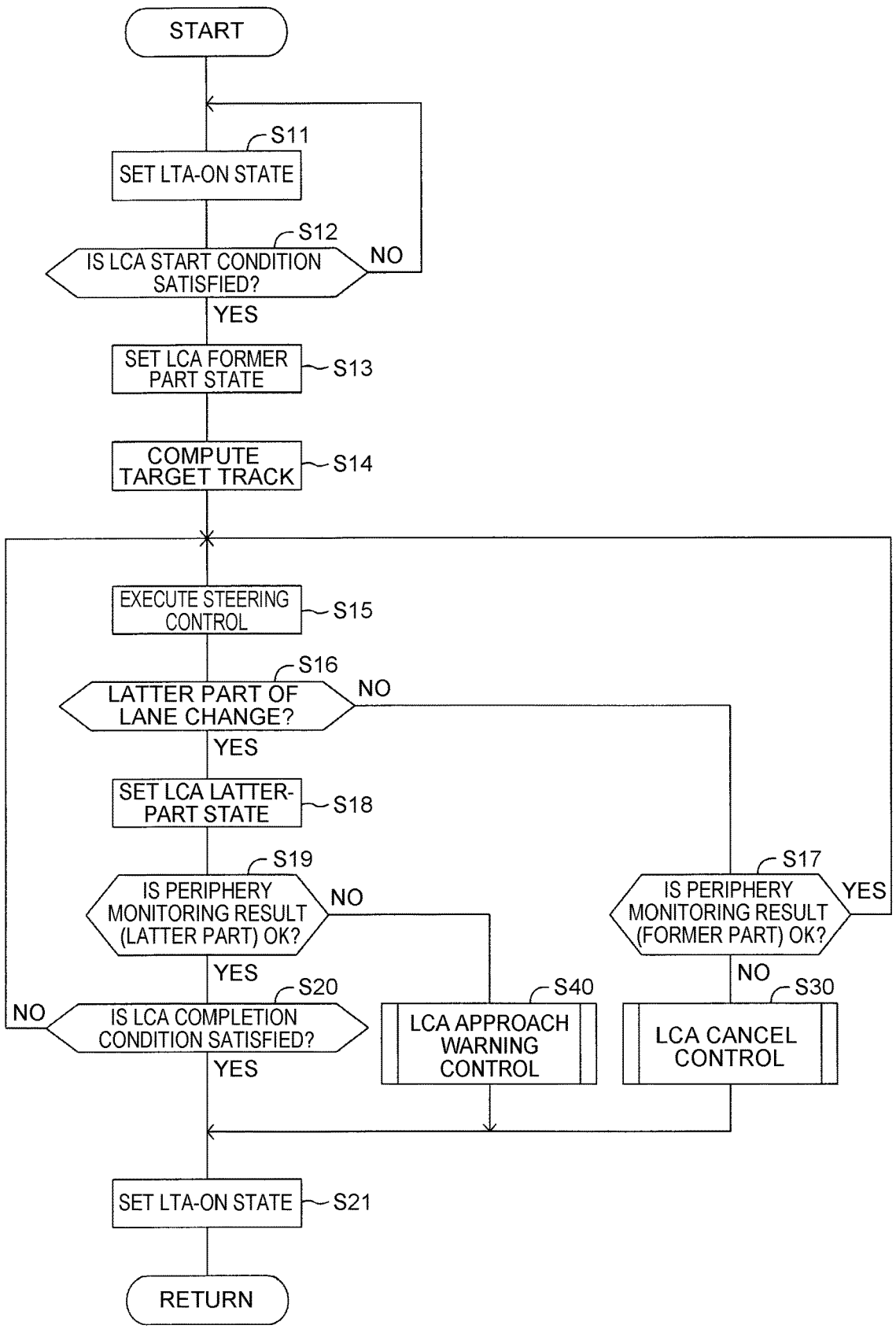
FIG. 5 is a flowchart showing a steering assist control routine.

FIG. 5 shows a steering assist control routine that is executed by the drive assist ECU 10. The steering assist control routine is executed in the case where an LTA execution permission condition is satisfied. The LTA execution permission condition includes a condition that the execution of the LTA is selected through the setting operation device 14, a condition that the ACC is executed, a condition that the camera sensor 12 can recognize white lines, and the like.

When the steering assist control routine is started, the drive assist ECU 10 sets the steering assist control state to an LTA-ON state, in step S11. The LTA-ON state means a control state in which the LTA is executed.

Subsequently, in step S12, the drive assist ECU 10 determines whether an LCA start condition is satisfied.

For example, the LCA start condition is satisfied in the case where all of the following conditions are satisfied. 1. The lane change assist request operation (lane change assist request signal) is detected. 2. The execution of the LCA is selected through the setting operation device 14. 3. The white line in a winker operation direction (the white line as the boundary between the previous lane and the target lane) is a broken line. 4. The result of an LCA execution determination based on the monitoring of the periphery is positive (an obstacle (another vehicle or the like) that obstructs the lane change is not detected and it is determined that the lane change is safely performed, from the periphery information obtained by the periphery sensor 11). 5. The road is an expressway (the road type information acquired from the navigation ECU 70 indicates an expressway). 6. The vehicle speed of the own vehicle is in an LCA permissible vehicle speed range in which the LCA is permitted. For example, the condition 4 is satisfied in the case where it is estimated that the inter-vehicle distance between the own vehicle and the other vehicle traveling on the target lane is properly secured after the lane change, based on the relative velocity between the own vehicle and the other vehicle. The LCA start condition is not limited to the conditions, and can be arbitrarily set.

In the case where the LCA start condition is not satisfied, the drive assist ECU 10 returns to the process to step S11 and continues the execution of the LTA.

When the LCA start condition is satisfied while the LTA is being executed (S12: Yes), the drive assist ECU 10 executes the LCA instead of the LTA, in step S13. In this case, the drive assist ECU 10 sets the steering assist control state to an LCA former-part state. The steering assist control state relevant to the LCA is divided into the LCA former-part state and an LCA latter-part state, and is set to the LCA former-part state at the start of the LCA. After the steering assist control state is set to the LCA former-part state, the drive assist ECU 10 sends an LCA execution display command to the meter ECU 30. Thereby, the execution status of the LCA is displayed on the display device 31.

Figure 8:
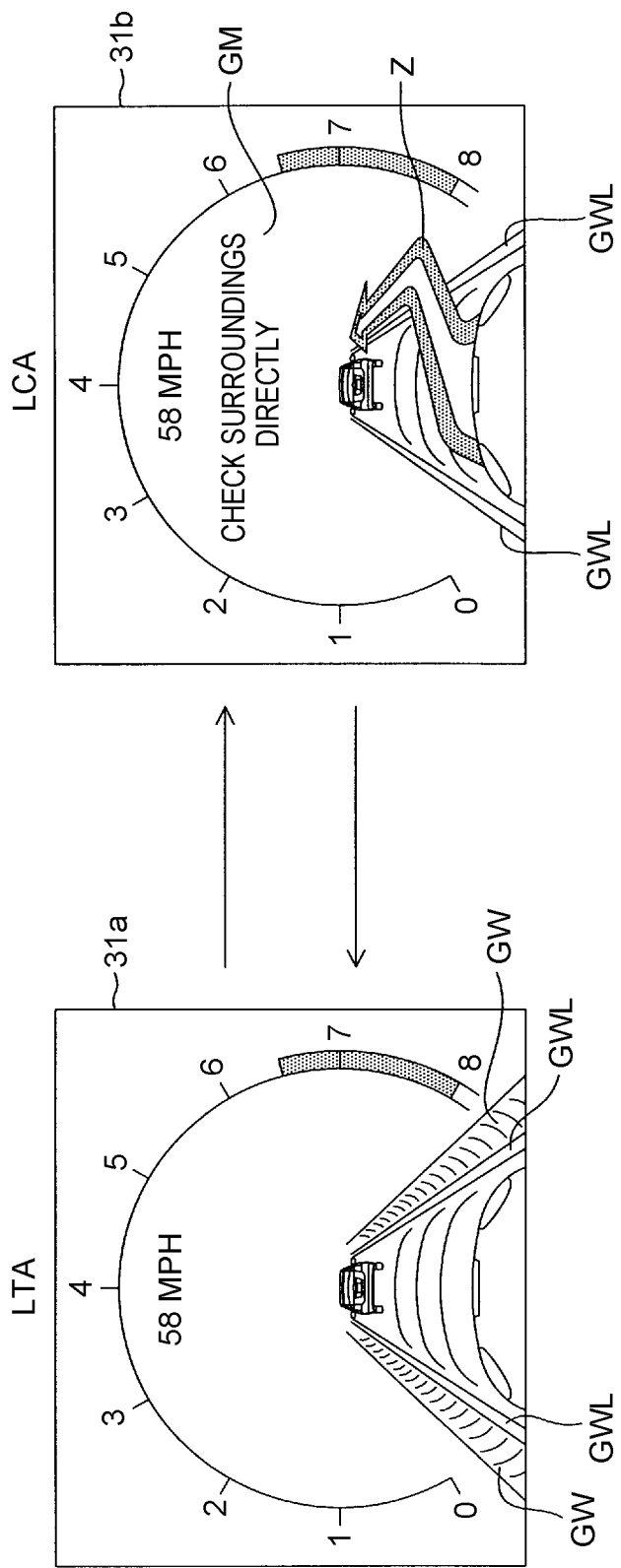
FIG. 8 is a diagram showing an LTA screen and an LCA screen on a display device.

FIG. 8 shows an exemplary screen 31a to be displayed on the display device 31 during the execution of the LTA (referred to as an LTA screen 31a) and an exemplary screen 31b to be displayed during the execution of the LCA (referred to as an LCA screen 31b). On both of the LTA screen 31a and the LCA screen 31b, an image in which the own vehicle travels between right and left white lines is displayed. On the LTA screen 31a, virtual walls GW are displayed outside of right and left white line images GWL. By the walls GW, the driver can recognize that the own vehicle is in a state where the own vehicle is being controlled so as to travel in the lane.

On the other hand, on the LCA screen 31b, the images of the walls GW are erased, and instead, a track Z in the LCA is displayed. The drive assist ECU 10 switches the screen to be displayed on the display device 31, between the LTA screen 31a and the LCA screen 31b, depending on the steering assist control state. Thereby, the driver can easily determine whether the execution status of the steering assist control is the LTA or the LCA.

The LCA is a control of merely assisting the driver's steering operation for lane change, and the driver is obligated to monitor the surroundings. Therefore, for prompting the driver to monitor the surroundings, a message GM of "CHECK SURROUNDINGS DIRECTLY" is displayed on the LCA screen 31b.

At the start of the LCA, first, the drive assist ECU 10 computes a target track, in step S14 of the routine shown in FIG. 5. Here, the target track in the LCA will be described.

Figure 9:
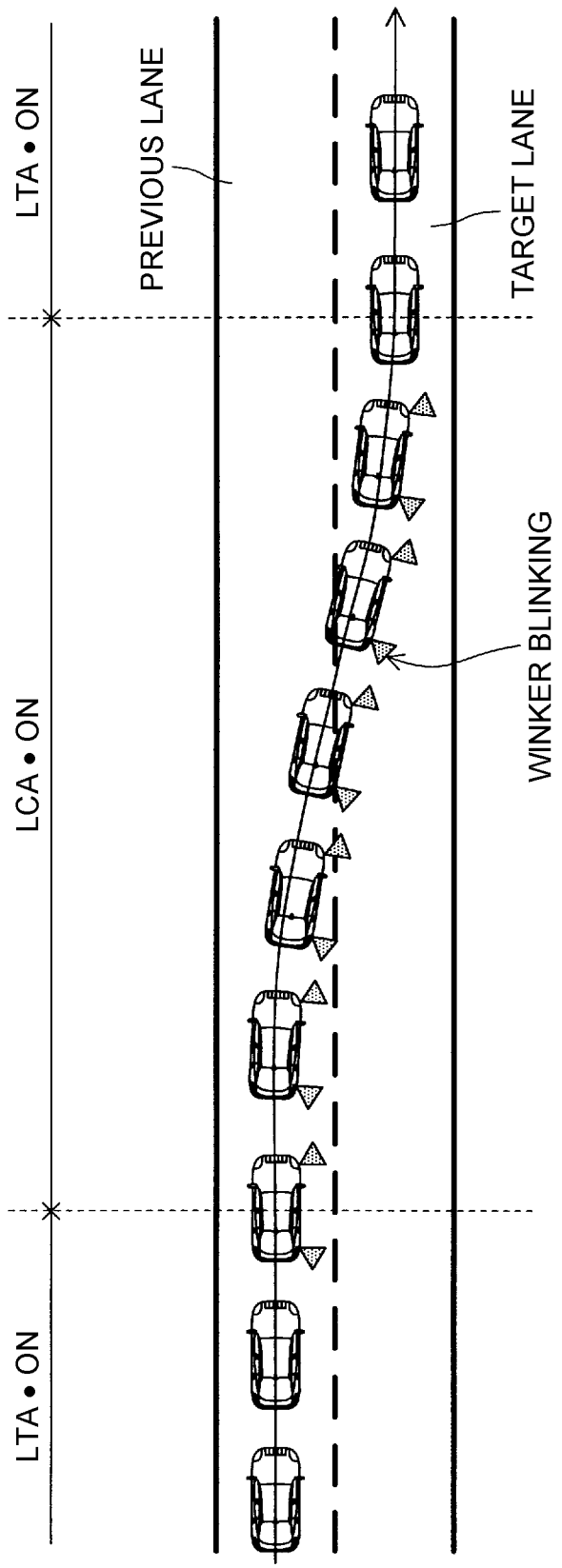
FIG. 9 is a diagram showing a target track.

In the execution of the LCA, the drive assist ECU 10 computes a target track function that determines the target track of the own vehicle. The target track is a track for moving the own vehicle from a lane (referred to as a previous lane) on which the own vehicle is currently traveling to a width-directional center position (referred to as a final target lateral position) on a lane (referred to as a target lane) that is adjacent to the previous lane and that is in a lane change assist request direction, in a target lane change time. For example, the target track has a form shown in FIG. 9.

As described below, the target track function is a function of using, as a variable, an elapsed time t from the time point of the start of the LCA (that is, the time point when the LCA start condition is satisfied) and calculating a target value (that is, a target lateral position) of the lateral position of the own vehicle corresponding to the elapsed time t with respect to the lane center line CL of the previous lane. Here, the lateral position of the own vehicle means the position of the center of gravity of the own vehicle in the lane width direction (also referred to as the lateral direction) with respect to the lane center line CL.

The target lane change time is variably set in proportion to a distance (hereinafter, referred to as a necessary lateral distance) by which the own vehicle moves in the lateral direction from an initial position that is the position at the start of the LCA (the lateral position of the own vehicle at the time point of the start of the LCA) to the final target lateral position. As an example, in the case where the lane width is 3.5 m, which is a general length, the target lane change time is set to 8.0 seconds, for example. In this example, at the start of the LCA, the own vehicle is positioned on the lane center line CL of the previous lane. The target lane change time is regulated in proportion to the length of the lane width. Accordingly, as the lane width is longer, the target lane change time is set to a larger value. On the other hand, as the lane width is shorter, the target lane change time is set to a smaller value.

In the case where the lateral position of the own vehicle at the start of the LCA is shifted from the lane center line CL of the previous lane to the lane change side, the target lane change time is set such that the target lane change time decreases as the shift amount (the lateral deviation Dy) is larger. On the other hand, in the case where the lateral position of the own vehicle at the start of the LCA is shifted from the lane center line CL of the previous lane to the side opposite to the lane change side, the target lane change time is set such that the target lane change time increases as the shift amount (the lateral deviation Dy) is larger. For example, in the case where the shift amount is 0.5 m, an increase-decrease regulation amount for the target lane change time is set to 1.14 seconds (=8.0×0.5/3.5). The above-described value for setting the target lane change time is merely an example, and an arbitrarily set value can be employed.

In the embodiment, a target lateral position y is computed by a target track function y(t) shown in the following Expression (2). The target track function y(t) is a quintic function in which the elapsed time t is used as a variable.

$$y(t)=c_0+c_1 \cdot t+c_2 \cdot t^2+c_3 \cdot t^3+c_4 \cdot t^4+c_5 \cdot t^5 \qquad (2)$$

The target track function y(t) is set to a function that allows the own vehicle to smoothly move to the final target lateral position.

Here, coefficients $c_0$, $c_1$, $c_2$, $c_3$, $c_4$, $c_5$ are determined by the state (initial lateral state amount) of the own vehicle at the start of the LCA and the target state (final target lateral state amount) of the own vehicle at the completion of the LCA.

Figure 10:
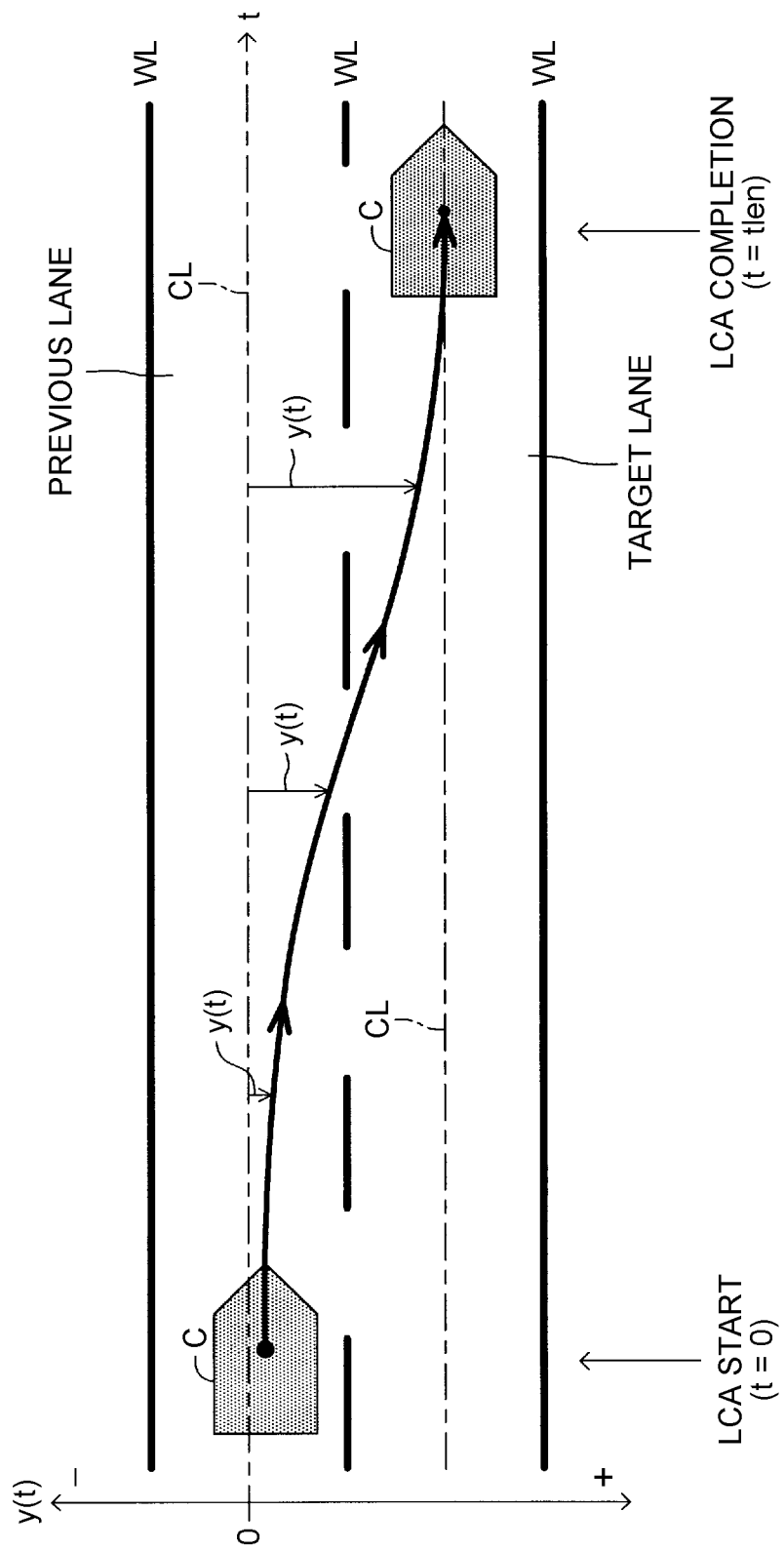
FIG. 10 is a diagram showing a target track function.

For example, as shown in FIG. 10, the target track function y(t) is a function of calculating the target lateral position y(t) of an own vehicle C corresponding to the elapsed time t (also referred to as the current time t) from the time point of the start of the LCA (the time point of the computation of the target track) with respect to the lane center line CL of the lane (previous lane) on which the own vehicle C is traveling at the current time point. In FIG. 10, the lane is linearly formed. In the case where the lane is formed as a curve, the target track function y(t) is a function of calculating the target lateral position of the own vehicle with respect to the lane center line CL formed as a curve.

For determining the coefficients $c_0$, $c_1$, $c_2$, $c_3$, $c_4$, $c_5$, the drive assist ECU 10 sets target track computation parameters as follows. The target track computation parameters are the following seven parameters (P1 to P7).

P1. A lateral position (referred to as an initial lateral position) of the own vehicle with respect to the lane center line of the previous lane at the LCA start time P2. A velocity (referred to as an initial lateral velocity) of the own vehicle in the lateral direction at the LCA start time P3. An acceleration (referred to as an initial lateral acceleration) of the own vehicle in the lateral direction at the LCA start time P4. A target lateral position (referred to as a final target lateral position) of the own vehicle with respect to the lane center line of the previous lane at the time point when the LCA is completed (referred to as an LCA completion time)

P5. A target velocity (referred to as a final target lateral velocity) of the own vehicle in the lateral direction at the LCA completion time P6. A target acceleration (referred to as a final target lateral acceleration) of the own vehicle in the lateral direction at the LCA completion time P7. A target time (referred to as a target lane change time) that is a target value of a time during which the LCA is executed (a time from the LCA start time to the LCA completion time)

As described above, the lateral direction is the lane width direction. Accordingly, the lateral velocity means the velocity of the own vehicle in the lane width direction, and the lateral acceleration means the acceleration of the own vehicle in the lane width direction.

A process of setting the seven target track computation parameters is referred to as an initialization process. In the initialization process, the target track computation parameters are set as follows. That is, the initial lateral position is set to a value equal to the lateral deviation Dy detected by the camera sensor 12 at the LCA start time. The initial lateral velocity is set to a value (v·sin(θy)) resulting from multiplying a vehicle speed v detected by the speed sensor at the LCA start time by a sine value (sin(θy)) of the yaw angle θy detected by the camera sensor 12. The initial lateral acceleration is set to a value (v·γ) resulting from multiplying a yaw rate γ (rad/s) detected by the yaw rate sensor at the LCA start time by the vehicle speed v. The initial lateral acceleration may be set to the differential value of the above initial lateral velocity. The initial lateral position, the initial lateral velocity and the initial lateral acceleration are collectively referred to as the initial lateral state amount.

The drive assist ECU 10 in the embodiment regards the lane width of the target lane as being equal to the lane width of the previous lane detected by the camera sensor 12. Accordingly, the final target lateral position is set to a value equal to the lane width of the previous lane (the final target lateral position=the lane width of the previous lane). Furthermore, the drive assist ECU 10 sets both values of the final target lateral velocity and the final target lateral acceleration to zero. The final target lateral position, the final target lateral velocity and the final target lateral acceleration are collectively referred to as the final target lateral state amount.

As described above, the target lane change time is calculated based on the lane width (or the lane width of the previous lane) and the shift amount of the own vehicle in the lateral direction at the LCA start time. For example, a target lane change time tlen is computed by the following Expression (3).

$$tlen = Dini \cdot A \quad (3)$$

Here, Dini is a necessary distance for moving the own vehicle from the LCA start position (initial lateral position) to the LCA completion position (final target lateral position) in the lateral direction. Accordingly, when the own vehicle is positioned on the lane center line CL of the previous lane at the LCA start time, Dini is set to a value equal to the lane width, and when the own vehicle is shifted from the lane center line CL of the previous lane, Dini is a value resulting from increasing or decreasing the lane width by the shift amount. A is a constant (referred to as a target time setting constant) indicating a target time spent moving the own vehicle in the lateral direction by unit distance, and for example, is set to (8 sec/3.5 m=2.29 sec/m). In this example, in the case where the necessary distance Dini for moving the own vehicle in the lateral direction is, for example, 3.5 m, the target lane change time tlen is set to 8 seconds.

The target time setting constant A is not limited to the above value, and can be arbitrarily set. Furthermore, for example, using the setting operation device 14, the target time setting constant A may be selected from a plurality of constants, depending on driver's taste. Alternatively, the target lane change time may be a fixed value.

The drive assist ECU 10 calculates the coefficients $c_0$, $c_1$, $c_2$, $c_3$, $c_4$, $c_5$ of the target track function y(t) expressed by Expression (2), based on the initial lateral state amount, final target lateral state amount and target lane change time that are evaluated by the initialization process of the target track computation parameters, and decides the target track function y(t).

From the target track function y(t) expressed by the above Expression (2), a lateral velocity y'(t) of the own vehicle can be expressed by the following Expression (4), and a lateral acceleration y''(t) of the own vehicle can be expressed by the following Expression (5).

$$y'(t) = c_1 + 2c_2 \cdot t + 3c_3 \cdot t^2 + 4c_4 \cdot t^3 + 5c_5 \cdot t^4 \quad (4)$$

$$y''(t) = 2c_2 + 6c_3 \cdot t + 12c_4 \cdot t^2 + 20c_5 \cdot t^3 \quad (5)$$

Here, when the initial lateral position is y0, the initial lateral velocity is vy0, the initial lateral acceleration is ay0, the final target lateral position is y1, the final target lateral velocity is vy1, the final target lateral velocity is ay1 and the lane width of the previous lane is W, the following relational expressions are obtained based on the above target track computation parameters.

$$y(0) = c_0 = y0 \quad (6)$$

$$y'(0) = c_1 = vy0 \quad (7)$$

$$y''(0) = 2c_2 = ay0 \quad (8)$$

$$y(tlen) = c_0 + c_1 \cdot tlen + c_2 \cdot tlen^2 + c_3 \cdot tlen^3 + c_4 \cdot tlen^4 + c_5 \cdot tlen^5 = y1 = W \quad (9)$$

$$y'(tlen) = c_1 + 2c_2 \cdot tlen + 3c_3 \cdot tlen^2 + 4c_4 \cdot tlen^3 + 5c_5 \cdot tlen^4 = vy1 = 0 \quad (10)$$

$$y''(tlen) = 2c_2 + 6c_3 \cdot tlen + 12c_4 \cdot tlen^2 + 20c_5 \cdot tlen^3 = ay1 = 0 \quad (11)$$

Accordingly, from the six Expressions (6) to (11), the values of the coefficients $c_0$, $c_1$, $c_2$, $c_3$, $c_4$, $c_5$ of the target track function y(t) can be calculated. Then, the calculated values of the coefficients $c_0$, $c_1$, $c_2$, $c_3$, $c_4$, $c_5$ are substituted into Expression (2), and thereby, the target track function y(t) is calculated. The drive assist ECU 10 holds the target track function y(t) until the LCA ends. At the same time as the calculation of the target track function y(t), the drive assist ECU 10 activates a timer (initial value: zero), and starts to count up the elapsed time t from the start of the LCA.

After the drive assist ECU 10 computes the target track function in this way, the drive assist ECU 10, in the subsequent step S15, performs the steering control, based on the target track function. The steering control will be specifically described.

First, the drive assist ECU 10 computes the target lateral state amount of the own vehicle at the current time point. The target lateral state amount includes a target lateral position that is a target value of the lateral position of the own vehicle in the lane width direction, a target lateral velocity that is a target value of the velocity (lateral velocity) of the own vehicle in the lane width direction, and a target lateral acceleration that is a target value of the acceleration (lateral acceleration) of the own vehicle in the lane width direction. The lateral velocity and the lateral acceleration are collectively referred to as a lateral motion state amount, and the target lateral velocity and the target lateral acceleration are collectively referred to as a target lateral motion state amount.

In this case, the drive assist ECU 10 computes the target lateral position, target lateral velocity and target lateral acceleration at the current time, based on the target track function y(t) decided in step S14 and the current time t. The current time t is the elapsed time after the target track function y(t) is decided in step S14, and is equivalent to the elapsed time from the start of the LCA. After the drive assist ECU 10 calculates the target track function y(t) in step S14, the drive assist ECU 10 resets the timer and starts to count up the elapsed time t (=the current time t) from the start of the LCA. The target lateral position is calculated by substituting the current time t into the target track function y(t), the target lateral velocity is calculated by substituting the current time t into the function y'(t) resulting from the first-order differentiation of the target track function y(t), and the target lateral acceleration is calculated by substituting the current time t into the function y''(t) resulting from the second-order differentiation of the target track function y(t). The drive assist ECU 10 reads the elapsed time t measured by the timer, and computes the target lateral state amount based on the measurement time t and the above functions.

Hereinafter, the target lateral position at the current time is represented by y*, the target lateral velocity at the current time is represented by vy*, and the target lateral acceleration at the current time is represented by ay*.

Subsequently, the drive assist ECU 10 computes a target yaw state amount that is a target value about the motion for changing the orientation of the own vehicle. The target yaw state amount indicates a target yaw angle θy* of the own vehicle, a target yaw rate γ* of the own vehicle and a target curvature Cu* at the current time point. The target curvature Cu* is the curvature of a track for the lane change of the own vehicle, that is, the curvature of a curve component for the lane change, which does not include the curve curvature of the lane.

The drive assist ECU 10 reads the vehicle speed v at the current time point (the current vehicle speed detected by the speed sensor), and computes the target yaw angle θy*, target yaw rate γ* and target curvature Cu* at the current time point, based on the vehicle speed v, the target lateral velocity vy* and the target lateral acceleration ay*, using the following Expressions (12), (13), (14).

$$\theta y^* = \sin^{-1}(vy^*/v) \quad (12)$$

$$\gamma^* = ay^*/v \quad (13)$$

$$Cu^* = ay^*/v^2 \quad (14)$$

That is, the target yaw angle θy* is calculated by substituting a value resulting from dividing the target lateral velocity vy* by the vehicle speed v, into an arc sine function. The target yaw rate γ* is calculated by dividing the target lateral acceleration ay* by the vehicle speed v. The target curvature Cu* is calculated by dividing the target lateral acceleration ay* by the square of the vehicle speed v.

Subsequently, the drive assist ECU 10 computes a target controlled variable in the LCA. In the embodiment, the drive assist ECU 10 computes a target steering angle θlca* as the target controlled variable. The target steering angle θlca* is calculated based on the target lateral position y*, the target yaw angle θy*, the target yaw rate γ*, the target curvature Cu* and the curvature Cu that are computed as described above, using the following Expression (15).

$$\theta lca^* = Klca1 \cdot (Cu^* + Cu) + Klca2 \cdot (\theta y^* - \theta y) + Klca3 \cdot (\gamma^* - \gamma) + Klca4 \cdot (\gamma^* - \gamma) + Klca5 \cdot \Sigma(y^* - y) \quad (15)$$

Here, Klca1, Klca2, Klca3, Klca4 and Klca5 are control gains. Cu is the curvature detected by the camera sensor 12 at the current time point (at the time of the computation). Further, y is the lateral position detected by the camera sensor 12 at the current time point (at the time of the computation), that is, corresponds to Dy. Further, θy is the yaw angle detected by the camera sensor 12 at the current time point (at the time of the computation). Further, γ represents the yaw rate of the own vehicle detected by the yaw rate sensor at the current time point. As γ, the differential value of the yaw angle θy can be used.

The first member on the right side is a feedforward controlled variable that is determined depending on the sum of the target curvature Cu* and the curvature Cu (the curve of the lane). Klca1·Cu* is a feedforward controlled variable for the lane change, and Klca1·Cu is a feedforward controlled variable for the traveling of the own vehicle along the curve of the lane. Accordingly, the controlled variable expressed by the first member on the right side is basically set to a value that allows the own vehicle to travel along a targeted course when the steering angle is controlled with the controlled variable. In this case, the control gain Klca1 is set to a value that depends on the vehicle speed v. For example, the control gain Klca1 may be set depending on a wheelbase L and a stability factor Ksf (fixed values determined for each vehicle), using the following Expression (16). Here, K is a fixed control gain.

$$Klca1 = K \cdot L \cdot (1 + Ksf \cdot v^2) \quad (16)$$

The second to fifth members on the right side are feedback controlled variables. The second member on the right side is a steering angle component that serves as a feedback component so as to decrease the deviation between the target yaw angle θy* and the actual yaw angle θy. The third member on the right side is a steering angle component that serves as a feedback component so as to decrease the deviation between the target lateral position y* and the actual lateral position y. The fourth member on the right side is a steering angle component that serves as a feedback component so as to decrease the deviation between the target yaw rate γ* and the actual yaw rate γ. The fifth member on the right side is a steering angle component that serves as a feedback component so as to decrease the integrated value Σ(y*−y) of the deviation between the target lateral position y* and the actual lateral position y.

The target steering angle θlca* is not limited to the target steering angle computed with the five steering angle components. Only arbitrary steering angle components of the steering angle components may be used in the computation, or another steering angle component may be added in the computation. For example, as the feedback controlled variable about the yaw motion, one of the deviation of the yaw angle and the deviation of the yaw rate may be used. Further, the feedback controlled variable using the integrated value Σ(y*−y) of the deviation between the target lateral position y* and the actual lateral position y may be excluded.

After the drive assist ECU 10 computes the target controlled variable, the drive assist ECU 10 sends a steering command indicating the target controlled variable, to the EPS ECU 20. In the embodiment, the drive assist ECU 10 computes the target steering angle θlca* as the target controlled variable. However, the drive assist ECU 10 may compute a target torque that gives the target steering angle θlca*, and may send a steering command indicating the target torque, to the EPS ECU 20. The description of the process of step S15 has been made above.

When the EPS ECU 20 receives the steering command from the drive assist ECU 10 through the CAN 100, the EPS ECU 20 drives and controls the steering motor 22 such that the steering angle follows the target steering angle θlca*.

Subsequently, in step S16, the drive assist ECU 10 determines whether the progress status of the lane change is a latter part.

Here, the determination of whether the progress status of the lane change is the former part or the latter part will be described. The drive assist ECU 10 detects the progress status of the lane change, based on the position of a reference point (the center of gravity of the vehicle in the embodiment) of the own vehicle. As the reference point of the own vehicle is closer to the final target lateral position (the width-directional center position on the target lane), the progress degree of the lane change is higher. The drive assist ECU 10 compares the position of the reference point of the own vehicle and a preset determination position, and thereby, determines whether the progress status of the lane change is the former part of the lane change or the latter part of the lane change. When the position of the reference point of the own vehicle (hereinafter, also referred to as merely the position or lateral position of the own vehicle) is on the side opposite to the lane change side (that is, on the previous lane side) from the determination position, the drive assist ECU 10 determines that the progress status of the lane change is the former part of the lane change. When the lateral position of the own vehicle is on the lane change side from the determination position, the drive assist ECU 10 determines that the progress status of the lane change is the latter part of the lane change. A functional unit of the drive assist ECU10 that detects the progress status of the lane change and that determines whether the progress status of the lane change is the former part of the lane change or the latter part of the lane change may function as a progress status detection unit.

As described below, during the execution of the LCA, peripheral vehicles are monitored based on the periphery information obtained by the periphery sensor 11. In the case of detecting another vehicle (also referred to as an approaching vehicle) that is likely to abnormally approach the own vehicle on the target lane when the LCA is continued, the LCA is stopped. When it is possible to prevent a part of the own vehicle from being out of the previous lane, the approaching vehicle does not collide with the own vehicle. Meanwhile, in the case where the own vehicle has entered the target lane, it is necessary to avoid the collision between the own vehicle and the approaching vehicle.

Hence, the drive assist ECU 10 in the embodiment grasps the progress status of the lane change, and switches the process when the approaching vehicle is detected between the former part and latter part of the lane change. Therefore, whether the progress status of the lane change is the former part or the latter part is determined. The determination of the progress status of the lane change is performed based on the lane information that is detected by the camera sensor 12.

Exemplary Former-Latter Part Determination Method 1

For example, in the case where it is estimated that the whole vehicle body of the own vehicle is positioned in the previous lane, the drive assist ECU 10 determines that the progress status of the lane change is the former part. In the case where it is estimated that at least a part of the vehicle body of the own vehicle is on the target lane beyond the previous lane, the drive assist ECU 10 determines that the progress status of the lane change is the latter part. In this case, whether a side surface of the own vehicle in the lane change direction has gone to the target lane side beyond a boundary white line as the boundary between the previous lane and the target lane (for example, whether a tire in the lane change direction has passed through the boundary white line) may be determined based on the lane information (particularly, the lane width and the lateral deviation Dy) detected by the camera sensor 12 and vehicle body size (particularly, vehicle body width).

Exemplary Former-Latter Part Determination Method 2

As described later, in the case where the approaching vehicle is detected in the former part of the lane change, the LCA is stopped halfway, and the steering control is performed such that the own vehicle is returned (or moved) to the center position of the previous lane in the lane width direction of the previous lane. The steering control is referred to as an LCA cancel control. Even when the approaching vehicle is detected and the LCA cancel control is executed, there is a fear that the own vehicle enters the target lane because of a delay in response of control, a delay in white line recognition, a delay in recognition in periphery monitoring, a delay in computation, and the like. Hence, in consideration of an overshoot (a lateral directional distance of movement in the lane change direction) due to a delay caused by these factors (due to a delay time from the time point when the approaching vehicle is detected to the time point when the lateral velocity of the own vehicle is switched in the direction opposite to the lane change direction), the progress status of the lane change may be switched between the former part and the latter part at an earlier timing before the side surface (tire) of the own vehicle passes through the boundary white line.

In this case, whether the side surface of the own vehicle has gone to the target lane side beyond the boundary white line may be determined based on a look-ahead lateral position Dyf in which the overshoot is considered. The overshoot is larger as the lateral velocity of the own vehicle is higher. Hence, the look-ahead lateral position Dyf may be computed by the following Expression (17), and whether the side surface of the own vehicle has gone to the target lane side beyond the boundary white line may be determined based on the look-ahead lateral position Dyf.

$$Dyf = Dy + vy \cdot Tre \quad (17)$$

Here, Dy represents the lateral deviation at the current time point, vy represents the lateral velocity at the current time point, and Tre represents a preset time (referred to as a look-ahead time) for compensating the delay in response.

In this case, a position that is offset from the lateral position of the own vehicle detected by the camera sensor 12 in the lateral direction (in a direction of approaching the target lane with respect to the center of the previous lane) by a predetermined distance (vy·Tre) set depending on the lateral velocity vy is regarded as the lateral position (look-ahead position) of the own vehicle. Then, it is determined whether the side surface of the own vehicle at the look-ahead position has gone beyond the boundary white line.

Exemplary Former-Latter Part Determination Method 3

For example, a particular position where the own vehicle is estimated not to enter the target lane by the LCA cancel control may be previously determined as the determination point. For example, as the determination position, Dy=0.5 m (fixed value) is adopted. This determination position is a position on the lane change side with respect to the lane center line CL. In this case, when the position of the center of gravity of the own vehicle does not go beyond a position 0.5 m away from the lane center line CL to the lane change side, that is, when the lateral deviation Dy to the lane change side is 0.5 m or less, it is determined that the lane change is the former part, and when the lateral deviation Dy to the lane change side exceeds 0.5 m, it is determined that the lane change is the latter part. In this example, in the case where the lane width is 3.5 m and the vehicle width of the own vehicle is 1.8 m, for example, when the lateral deviation Dy is 0.5 m, the distance between the position of the center of gravity of the own vehicle and the boundary white line is 1.25 m (=(3.5/2)−0.5), and therefore, the distance between the side surface of the own vehicle on the lane change side and the boundary white line is 0.35 m (=1.25−(1.8/2)). Accordingly, in this example, when the overshoot is 0.35 m or less, it is possible to prevent the own vehicle from entering the target lane, by the LCA cancel control. In the case of using this former-latter part determination method, the determination position may be determined in consideration of the lane width and the overshoot amount.

In other words, in the exemplary former-latter part determination method 2 and the exemplary former-latter part determination method 3, the drive assist ECU 10 is configured to set the determination position to a particular position where the own vehicle is on the side of the center of the previous lane from the boundary between the previous lane and the target lane and where the own vehicle is on the side of the boundary from the center position of the previous lane in the lane width direction of the previous lane, to determine that the progress status is the former part in the case where it is estimated that the own vehicle is positioned in the direction opposite to the lane change direction from the determination position, and to determine that the progress status is the latter part in the case where it is estimated that the own vehicle is positioned in the lane change direction from the determination position.

In the following description, the drive assist ECU 10 determines the progress status of the lane change, using the exemplary former-latter part determination method 2 and the exemplary former-latter part determination method 3.

The description returns to the steering assist control routine in FIG. 5. Since the progress status at the time of the start of the LCA is the former part, the determination of "No" is made in step S16. In this case, in step S17, the drive assist ECU 10 determines whether there is another vehicle that abnormally approaches the own vehicle (another vehicle that can collide with the own vehicle) when the own vehicle performs the lane change along the target track, based on the periphery information obtained by the periphery sensor 11.

For example, the drive assist ECU 10 computes a predicted time (collision time TTC: Time to Collision) from the current time point to the collision of the other vehicle with the own vehicle, based on the relative velocity between the own vehicle and the "different vehicle that exists on the previous lane or a lane adjacent to the previous lane" and the distance between the own vehicle and the other vehicle. The drive assist ECU 10 determines whether the collision time TTC is equal to or more than a former-part threshold TTC1, and outputs a periphery monitoring result as the determination result. When the collision time TTC is equal to or more than the former-part threshold TTC1, the periphery monitoring result is "there is no approaching vehicle", and when the collision time TTC is less than the former-part threshold TTC1, the periphery monitoring result is "a vehicle is approaching". For example, the former-part threshold TTC1 is set to four seconds.

Furthermore, in step S17, the drive assist ECU 10 may determine whether there is another vehicle in the lateral direction of the own vehicle, and may determine that a vehicle is approaching, in the case where there is another vehicle in the lateral direction of the own vehicle. In addition, in step S17, the drive assist ECU 10 may determine whether the own vehicle abnormally approaches another vehicle that exists on the target lane when the own vehicle performs the lane change by the LCA, based on the distance from the other vehicle and the relative velocity, and may determine that a vehicle is approaching, in the case where the own vehicle abnormally approaches the other vehicle.

In the case where the periphery monitoring result is "there is no approaching vehicle" in step S17 (S17: Yes), the drive assist ECU 10 returns the process to step S15, and in the case where the periphery monitoring result is "a vehicle is approaching" (S17: No), the drive assist ECU 10 proceeds with the process to step S30. Here, the case where the periphery monitoring result is "there is no approaching vehicle" will be described.

While the periphery monitoring result is "there is no approaching vehicle", the drive assist ECU 10 repeats the processes of the above-described steps S15 to S17, in a predetermined computation cycle. Thereby, the LCA is continued, and the own vehicle moves toward the target lane.

After the repeat of the processes, in the case where the progress status of the lane change is the latter part (S16: Yes), the drive assist ECU 10 sets the steering assist control state to the LCA latter-part state, in step S18. The LCA control content itself does not differ between the LCA former-part state and the LCA latter-part state, as long as the LCA is not stopped by the detection of the approaching vehicle. In other words, in the case where the LCA is stopped by the detection of the approaching vehicle, the subsequent process differs depending on whether the progress status of the lane change at the time point when the LCA is stopped is the LCA former-part state or the LCA latter-part state.

Subsequently, in step S19, the drive assist ECU 10 determines whether there is another vehicle that abnormally approaches the own vehicle (another vehicle that can collide with the own vehicle) when the own vehicle performs the lane change along the target track, based on the periphery information obtained by the periphery sensor 11. In this case, similarly to step S17, the drive assist ECU 10 computes the collision time TTC and determines whether there is a vehicle that abnormally approaches the own vehicle. As the determination threshold, the drive assist ECU 10 uses a latter-part threshold TTC2. That is, when the collision time TTC is equal to or more than the latter-part threshold TTC2, the drive assist ECU 10 determines "there is no approaching vehicle", and when the collision time TTC is less than the latter-part threshold TTC2, the drive assist ECU 10 determines "a vehicle is approaching" as the periphery monitoring result.

The latter-part threshold TTC2 is set to a smaller value than the former-part threshold TTC1. For example, the latter-part threshold TTC2 is set to two seconds. Accordingly, in the LCA latter-part state, the drive assist ECU 10 determines "a vehicle is approaching" in the case of detecting another vehicle with a higher approach level than in the LCA former-part state.

When the periphery monitoring result is "there is no approaching vehicle" in step S19, the drive assist ECU 10 proceeds with the process to step S20, and determines whether an LCA completion condition is satisfied. In the embodiment, the LCA completion condition is satisfied when the lateral position y of the own vehicle reaches the final target lateral position y*. In the case where the LCA completion condition is not satisfied, the drive assist ECU 10 returns the process to step S15, and repeats the processes of the above-described steps S15 to S20 in a predetermined computation cycle. Thus, the LCA is continued.

During the execution of the LCA, the target lateral state amount (y*, vy*, ay*) depending on the elapsed time t is computed. Furthermore, the target yaw state amount (θy*, γ*, Cu*) is computed based on the computed target lateral state amount (y*, vy*, ay*) and the vehicle speed v, and the target controlled variable (θlca*) is computed based on the computed target yaw state amount (θy*, γ*, Cu*). Whenever the target controlled variable (θlca*) is computed, the steering command indicating the target controlled variable (θlca*) is sent to the EPS ECU 20. Thus, the own vehicle travels along the target track.

When the traveling position of the own vehicle is switched from the previous lane to the target lane during the execution of the LCA, the lane-related vehicle information (Cu, Dy, θy) to be supplied from the camera sensor 12 to the drive assist ECU 10 is switched from the lane-related vehicle information about the previous lane to the lane-related vehicle information about the target lane. Therefore, it is not possible to use the target track function y(t) computed at the time of the start of the LCA, with no change. When the lane where the own vehicle is positioned is switched, the sign of the lateral deviation Dy is inverted. Hence, when the drive assist ECU 10 detects the switching of the sign (positive or negative) of the lateral deviation Dy to be output by the camera sensor 12, the drive assist ECU 10 offsets the target track function y(t) by the lane width W of the previous lane. Thereby, it is possible to convert the target track function y(t) computed on the basis of the lane center line CL of the previous lane, into the target track function y(t) on the basis of the lane center line CL of the target lane.

In the case where the drive assist ECU 10 determines that the LCA completion condition is satisfied in step S20, the drive assist ECU 10 sets the steering assist control state to the LTA-ON state in step S21. That is, the drive assist ECU 10 ends the LCA, and restarts the LTA. Thereby, the steering control is performed such that the own vehicle travels along the lane center line CL of the target lane. After the drive assist ECU 10 sets the steering assist control state to the LTA-ON state in step S21, the drive assist ECU 10 returns the process to step S11, and continues the above-described steering assist control routine.

When the LCA is completed and the steering assist control state is set to the LTA-ON state, the screen to be displayed on the display device 31 is switched from the LCA screen 31b to the LTA screen 31a, as shown in FIG. 8.

The drive assist ECU 10 sends the command to blink the winker 32 for the winker operation direction, to the meter ECU 30, in a period from the start of the LCA to the end of the steering assist control routine. The winker 32 is blinked by the blinking command to be sent from the steering ECU 40 in connection with the operation of the winker lever 41 to the first stroke position P1L (P1R), before the start of the LCA. Even when the blinking command to be sent from the steering ECU 40 is stopped, the meter ECU 30 continues the blinking of the winker 32 while the blinking command is sent from the drive assist ECU 10.

Figure 6:
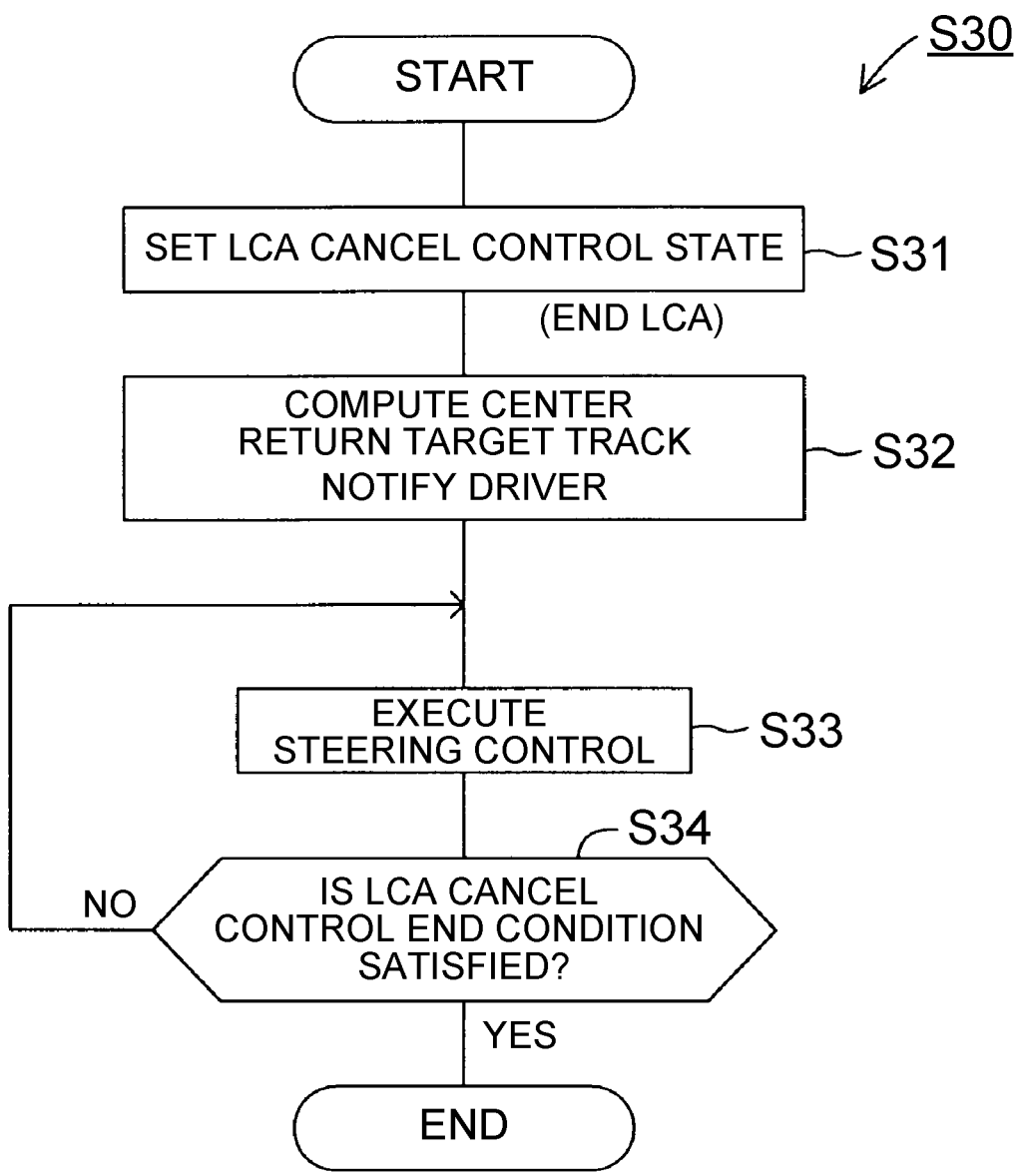
FIG. 6 is a flowchart showing an LCA cancel control routine.

Next, the case where the periphery monitoring result in step S17 is "a vehicle is approaching" in the LCA former-part state will be described. In the case where the periphery monitoring result is "a vehicle is approaching" in the LCA former-part state, the drive assist ECU 10 proceeds with the process to step S30, and executes the LCA cancel control. FIG. 6 is a flowchart showing an LCA cancel control routine that is the process of step S30.

In the LCA former-part state, the own vehicle exists on the previous lane. Thereby, when the own vehicle does not enter the target lane, the other vehicle (approaching vehicle) does not abnormally approach the own vehicle. Hence, in the LCA cancel control routine, the following process is executed such that the own vehicle does not enter the target lane.

First, in step S31, the drive assist ECU 10 sets the steering assist control state to an LCA cancel control state. When the steering assist control state is set to the LCA cancel control state, the LCA is ended.

Subsequently, in step S32, the drive assist ECU 10 computes a target track for moving the own vehicle from the current position (the position of the own vehicle at the moment when the LCA cancel control state is set) to the center position of the previous lane in the lane width direction of the previous lane (hereinafter, referred to as merely the center position). Hereinafter, the target track is referred to as a center return target track. The function y(t) shown in Expression (2) is used also for the center return target track. A function expressing the center return target track is referred to as a center return target track function y(t). In the calculation of the center return target track function y(t), for determining the coefficients $c_0$, $c_1$, $c_2$, $c_3$, $c_4$, $c_5$ of the function y(t) shown in Expression (2), center return target track computation parameters are set as follows. The center return target track computation parameters are the following seven parameters (P11 to P17).

P11. A lateral position of the own vehicle at the current time point (the time when the LCA cancel control state is set)

P12. A lateral velocity of the own vehicle at the current time point (at the time when the LCA cancel control state is set)

P13. A lateral acceleration of the own vehicle at the current time point (the time when the LCA cancel control state is set)

P14. A target lateral position (the center position of the previous lane in the embodiment; hereinafter, referred to as a center return completion target lateral position) that is a target value of the lateral position for the movement of the own vehicle P15. A target lateral velocity (referred to as a center return completion target lateral velocity) of the own vehicle when the own vehicle is moved to the center return completion target lateral position P16. A target lateral acceleration (referred to as a center return completion target lateral acceleration) of the own vehicle when the own vehicle is moved to the center return completion target lateral position P17. A target time (referred to as a center return target time) that is a target value of a time necessary to move the own vehicle from the current position to the center return target lateral position Here, the lateral position of the own vehicle at the current time point (the time when the LCA cancel control state is set) is represented by ycancel, the lateral velocity at the current time point is represented by vycancel, the lateral acceleration at the current time point is represented by aycancel, the time when the steering assist control state is set to the LCA cancel control state is newly set to t=0, and the center return target time is represented by tcancel. The center return target track computation parameters are set to y(0)=ycancel, y'(0)=vycancel, y''(0)=aycancel, y(tcancel)=0, y'(tcancel)=0, and y''(tcancel)=0.

The lateral position ycancel, the lateral velocity vycancel and the lateral acceleration aycancel are detection values at the current time point, and can be computed by the same method as the above-described method for evaluating the initial lateral state amount. That is, the lateral position ycancel is the lateral deviation Dy at the current time point. The lateral velocity vycancel is evaluated from the vehicle speed v at the current time point and the yaw angle θy at the current time point (vycancel=v·sin(θy)). The lateral acceleration aycancel is a value (v·γ) resulting from multiplying the yaw rate γ at the current time point by the vehicle speed v at the current time point. Further, y(tcancel) is set to the center return completion target lateral position, that is, the center position of the previous lane. Both y'(tcancel), which expresses the center return completion target lateral velocity, and y"(tcancel), which expresses the center return completion target lateral acceleration, are set to zero.

The center return target time tcancel is computed by the following Expression (18), using a target time setting constant Acancel set to a similar value to the target time setting constant A that is used when the target lane change time tlen is computed at the start of the LCA.

$$tcancel = Dcancel \cdot Acancel \quad (18)$$

Here, Dcancel is a necessary distance for moving the own vehicle in the lateral direction from the lateral position of the own vehicle at the time when the steering assist control state is set to the LCA cancel control state to the center return completion target lateral position (the center position of the previous lane). In the LCA cancel control state, there is no emergency, because the own vehicle exists on the previous lane. Therefore, the velocity of the movement of the own vehicle in the lateral direction may be similar to that in the LCA. Accordingly, the target time setting constant Acancel is set to a similar value to the target time setting constant A in the execution of the LCA.

Based on the setting values of the center return target track computation parameters, the drive assist ECU 10 calculates the values of the coefficients $c_0, c_1, c_2, c_3, c_4, c_5$ of the function y(t) expressed by Expression (2), by the same method as step S14. Then, the drive assist ECU 10 substitutes the calculated values of the coefficients $c_0, c_1, c_2, c_3, c_4, c_5$ into Expression (2), and thereby, calculates the center return target track function y(t).

Figure 11:
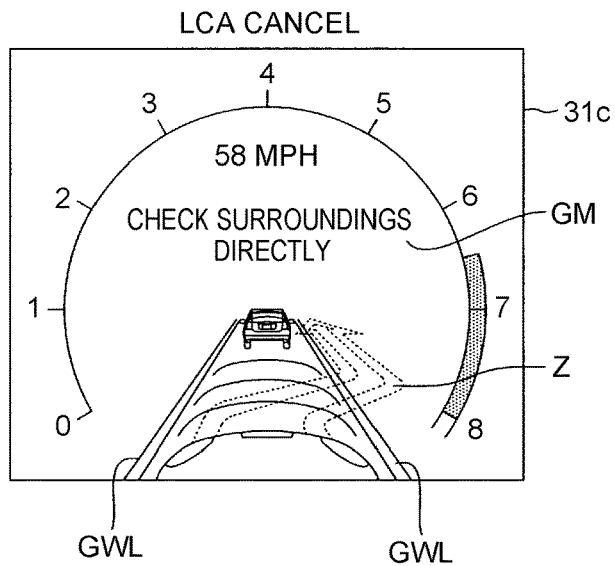
FIG. 11 shows an LCA cancel screen on the display device.

In step S32, at the same time as the calculation of the center return target track function, the drive assist ECU 10 notifies the driver of the cancel (halfway stop) of the LCA. For example, the drive assist ECU 10 drives the buzzer 13 to generate a notice sound (for example, two beeps), and sends an LCA cancel notice command to the meter ECU 30. When the meter ECU 30 receives the LCA cancel notice command, the meter ECU 30 displays an LCA cancel screen 31c on the display device 31, as shown in FIG. 11. In the LCA cancel screen 31c, the track Z (see FIG. 8) brightly displayed until that time is darkened, or is erased. Thereby, the driver recognizes the end of the LCA. The LCA cancel screen 31c is displayed until the LCA cancel control state ends.

Subsequently, in step S33, the drive assist ECU 10 performs the steering control based on the center return target track function y(t) calculated in the previous step S32. In this case, the drive assist ECU 10 resets the timer t (clears the timer t to zero and then starts the timer t), and computes the target lateral motion state amount (y*, vy*, ay*) and the target yaw state amount (θy*, γ*, Cu*) from the elapsed time t after the steering assist control state is set to the LCA cancel control state and the center return target track function y(t), similarly to step S15, to compute a final target steering angle θcancel*. For example, the target steering angle θcancel* can be computed similarly to θlca*, by replacing the left side of Expression (15) with θcancel*.

After the drive assist ECU 10 computes the target controlled variable (target steering angle θcancel*), the drive assist ECU 10 sends the steering command indicating the target controlled variable, to the EPS ECU 20. In the embodiment, the drive assist ECU 10 computes the target steering angle θcancel* as the target controlled variable. However, the drive assist ECU 10 may compute a target torque that gives the target steering angle θcancel*, and may send the steering command indicating the target torque, to the EPS ECU 20.

Subsequently, in step S34, the drive assist ECU 10 determines whether an end condition of the LCA cancel control state is satisfied. In this case, the drive assist ECU 10 determines that the end condition of the LCA cancel control state is satisfied, when the drive assist ECU 10 detects that the lateral position of the own vehicle has reached the center return completion target lateral position (the center position of the previous lane) by the above steering control. Alternatively, the drive assist ECU 10 may determine that the end condition of the LCA cancel control state is satisfied, when the drive assist ECU 10 detects that the LCA cancel control state is continued for a certain preset time (for example, the center return target time tcancel or a time that is a predetermined time longer than the center return target time tcancel).

In the case where the drive assist ECU 10 determines that the end condition of the LCA cancel control state is not satisfied (S34: No), the drive assist ECU 10 returns the process to step S33. Accordingly, the steering control is executed until the end condition of the LCA cancel control state is satisfied. Thereby, the own vehicle travels toward the center position of the previous lane.

When the end condition of the LCA cancel control state is satisfied as a result of the repeat of the processes, the drive assist ECU 10 ends the LCA cancel control routine, and proceeds with the process to step S21 of the main routine (steering assist control routine). Thereby, the steering assist control state is switched from the LCA cancel control state to the LTA-ON state. A functional unit of the drive assist ECU 10 that executes the LCA cancel control routine may function as a center return assist control unit.

Figure 14:
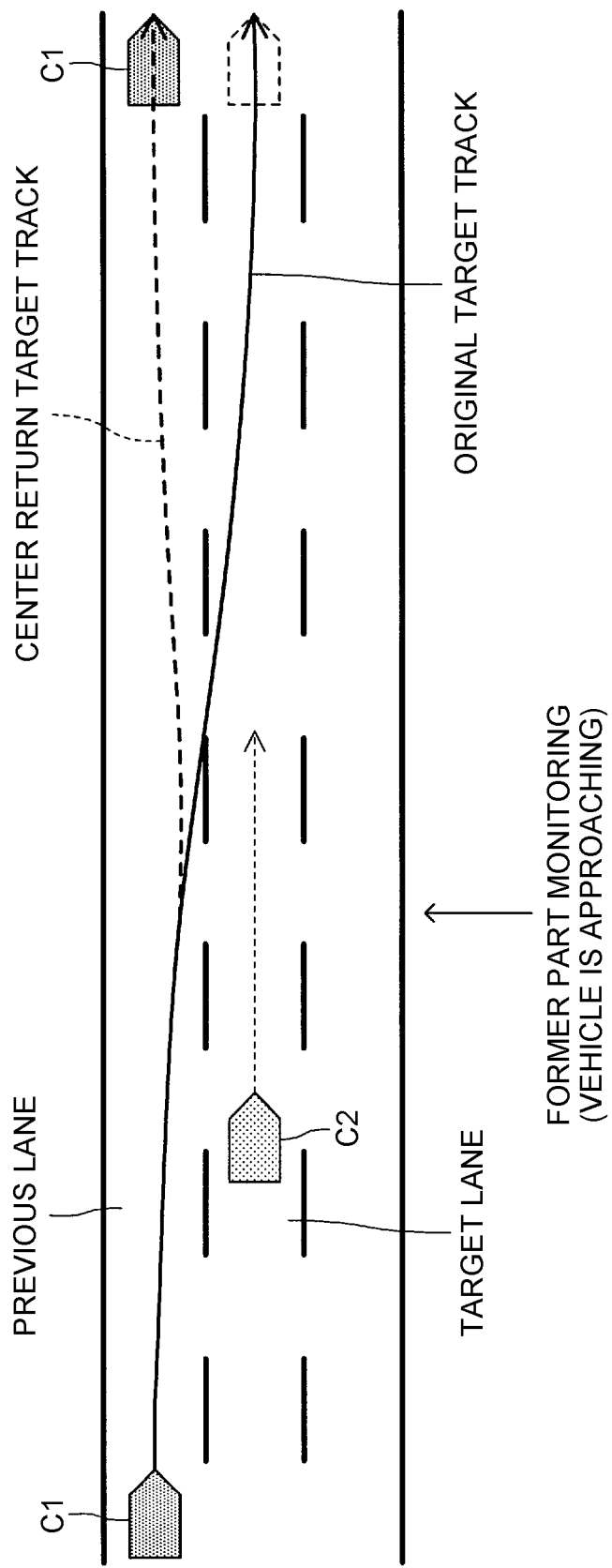
FIG. 14 is a diagram showing a target track and a center return target track.

FIG. 14 shows a center return target track when an own vehicle C1 approaches another vehicle C2 that travels on the target lane in the LCA former-part state.

Figure 7:
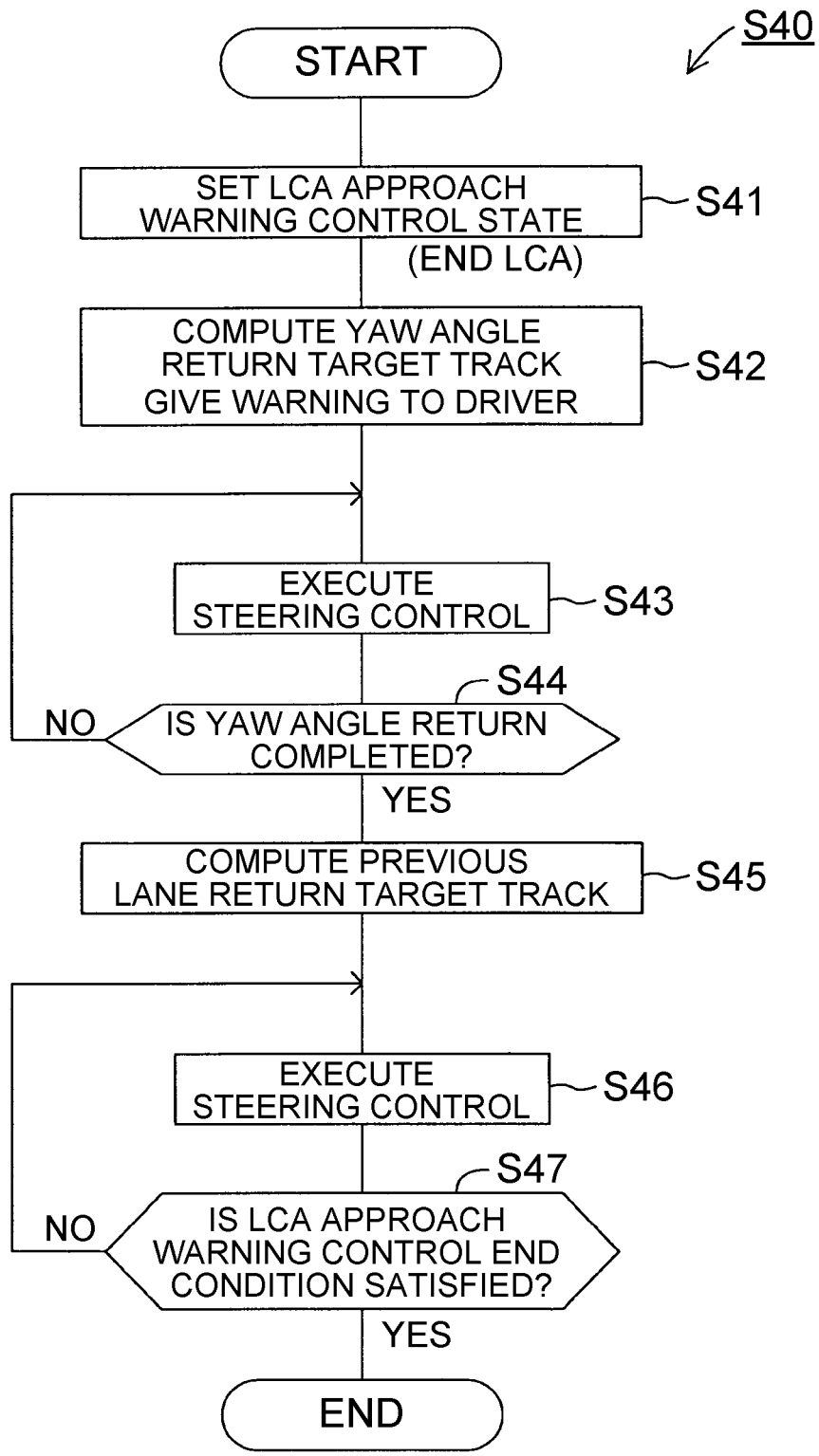
FIG. 7 is a flowchart showing an LCA approach warning control routine.

Next, the case where the periphery monitoring result in step S19 is "a vehicle is approaching" in the LCA latter-part state (S19: No) will be described. In the case where the periphery monitoring result is "a vehicle is approaching" in the LCA latter-part state, the drive assist ECU 10 proceeds with the process to step S40, and executes an LCA approach warning control. FIG. 7 is a flowchart showing an LCA approach warning control routine that is the process of step S40.

Figure 16:
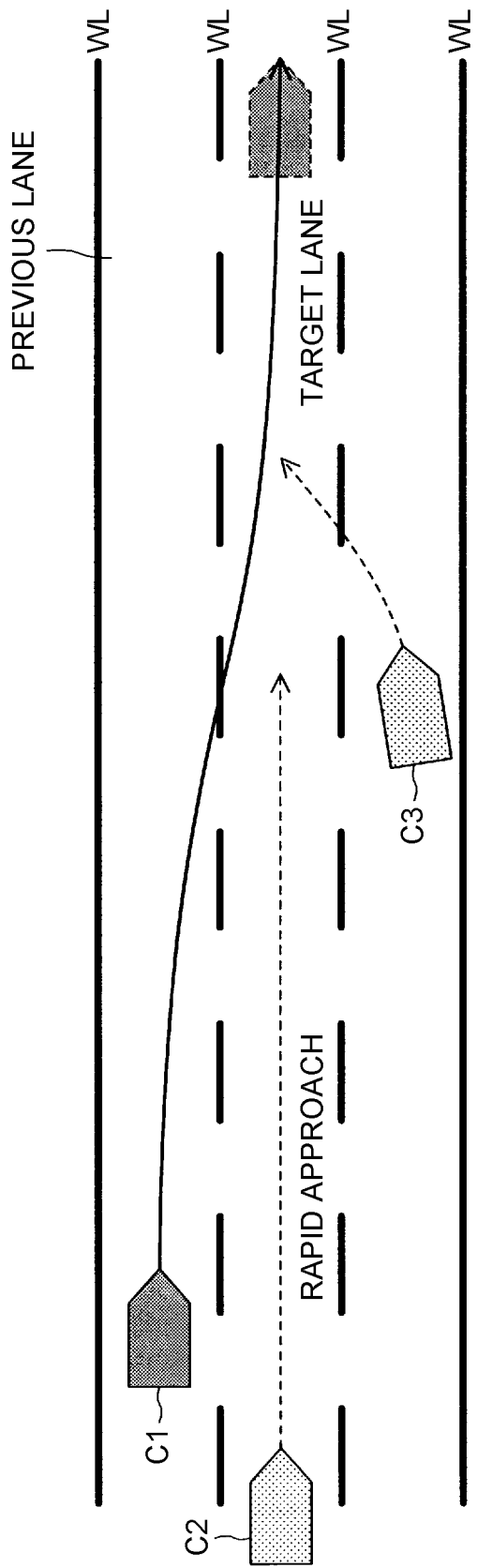
FIG. 16 is a diagram showing an approach situation of an own vehicle and another vehicle.

When the periphery monitoring result in the LCA former-part state is "there is no approaching vehicle", no approaching vehicle is ordinarily detected in the LCA latter-part state. However, during the execution of the LCA, there can be a case where the other vehicle C2 rapidly approaches the own vehicle C1 from the back on the target lane at an unexpected relative velocity as shown in FIG. 16, a case where another vehicle C3 enters the target lane from a lane that is further adjacent to the target lane (a lane that is two lanes away from the previous lane) and abnormally approaches the own vehicle C1, and the like. Further, there can be a case where another vehicle in a blind area of the periphery sensor 11 abnormally approaches the own vehicle.

Hence, in the LCA approach warning control of step S40, in addition to a warning to the driver, a process of changing the motion of the own vehicle in a short time such that the own vehicle does not move to the width-directional center side of the target lane and assisting the avoidance of the collision with the other vehicle is executed.

When the LCA approach warning control routine in step S40 is started, the drive assist ECU 10 sets the steering assist control state to an LCA approach warning control state in step S41. When the steering assist control state is set to the LCA approach warning control state, the LCA is ended.

Subsequently, in step S42, the drive assist ECU 10 computes a yaw angle return target track for returning the yaw angle of the own vehicle to the state just before the start of the LCA.

Here, the yaw angle return target track will be described. The yaw angle return target track means a target track for adjusting the yaw angle of the own vehicle to zero in a time that is as short as possible and that causes no problem on driving stability of the vehicle (in other words, a target track for adjusting the lateral velocity of the own vehicle in the lane change direction to zero in a time that is as short as possible and that causes no problem on driving stability of the vehicle). Just before the start of the LCA, the LTA is being executed. Accordingly, at the start of the LCA, the yaw angle is estimated to be a value close to zero. Hence, the drive assist ECU 10 computes the yaw angle return target track for canceling the target lateral velocity vy* computed from the target track function in the LCA (adjusting the target lateral velocity vy* to zero) by returning the yaw angle generated in the LCA to the state just before the start of the LCA.

The above-described target track in the LCA means the target lateral position with respect to the elapsed time from the LCA start time. On the other hand, the yaw angle return target track means a target curvature with respect to an elapsed time from the time point when the approaching vehicle is detected in the LCA latter-part state. The target controlled variable to be finally output to the EPS ECU 20 is set to a value resulting from multiplying the sum of the target curvature and the curvature (the curvature of the curve of the lane) detected by the camera sensor 12, by a control gain (which is a coefficient for converting the curvature into a steering angle and may be the above-described control gain Klca1).

Here, a method for returning the yaw angle to the state just before the start of the LCA will be described. The target controlled variable in the LCA is represented by the target steering angle θlca*. As expressed by the above Expression (15), the target steering angle θlca* includes a feedforward control member (Klca1·Cu*) computed from the target curvature Cu*.

The change in the target curvature corresponds to the change in the steering angle, and can be regarded as the change in the yaw angle. Accordingly, in the case of detecting the approaching vehicle in the LCA latter-part state, it is possible to return the yaw angle to the state just before the start of the LCA, by computing the integrated value of the target curvature Cu* in a period from the start of the LCA to the detection of the approaching vehicle, and after the inversion of the sign, outputting the controlled variable corresponding to the integrated value of the target curvature Cu* to the EPS ECU 20.

Figure 12:
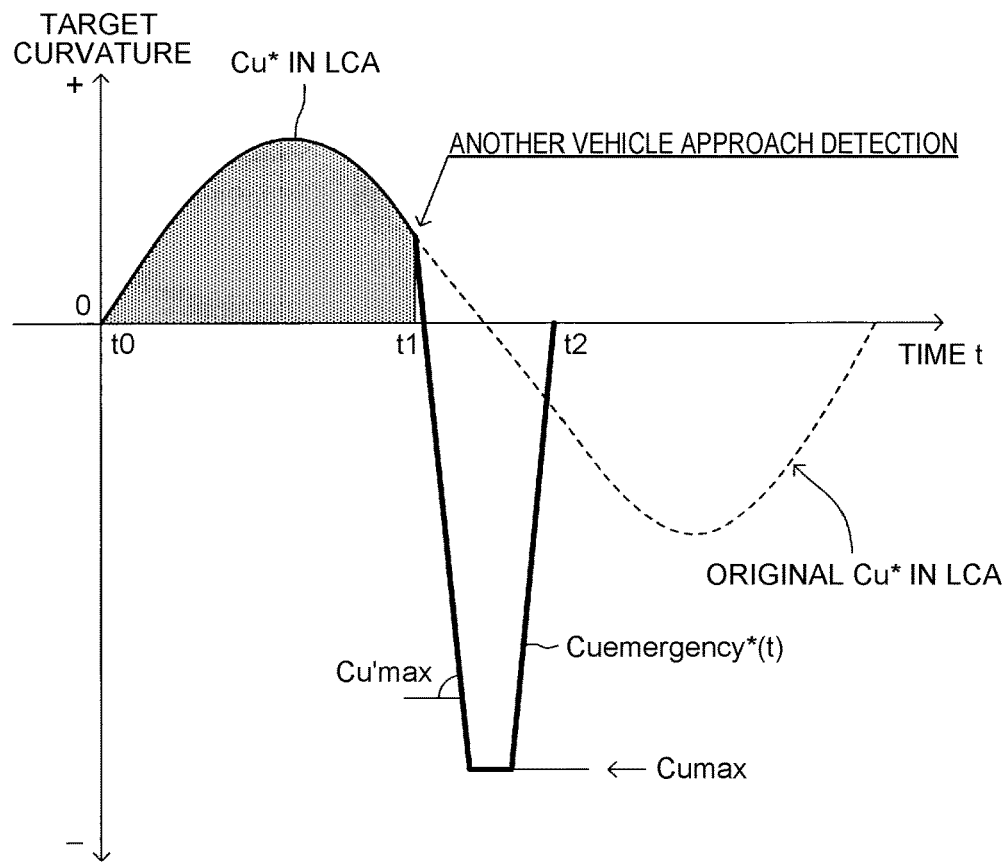
FIG. 12 shows a graph of a target curvature.

For example, as shown in FIG. 12, in the case where the approaching vehicle is detected at time t1, the integrated value of the target curvature Cu* from time t0 when the LCA is started to time t1 corresponds to the area of the gray portion in the figure. Accordingly, by inverting the sign of the feedforward controlled variable corresponding to the area (inverting the right-left direction) and giving the command to the EPS ECU 20, it is possible to return the yaw angle to the state just before the start of the LCA, at the time point when the output of the feedforward controlled variable is completed. The value resulting from inverting the sign (positive or negative) of the integrated value of the target curvature Cu* from time t0 to time t1 is referred to as an inverse integrated value. By adding the inverse integrated value to the integrated value of the target curvature Cu* from time t0 to time t1, it is possible to adjust the integrated value of the target curvature Cu* from the start of the LCA, to zero.

In the case of detecting the approaching vehicle (the other vehicle that is likely to abnormally approach the own vehicle on the target lane) in the LCA latter-part state, the own vehicle is in an emergency state because there is a high possibility that a part of the own vehicle has entered the target lane. Accordingly, it is necessary to return the yaw angle to zero and make the own vehicle parallel to the direction in which the lane extends, in as short a time as possible. Meanwhile, a control system of the steering assist system determines an upper value of magnitude of a lateral acceleration of the vehicle (which is a lateral acceleration to act on the vehicle and is different from the lateral acceleration in the lane width direction) and an upper limit of magnitude of a change rate at which the lateral acceleration can be changed (an upper limit of magnitude of a change amount of the lateral acceleration per unit time).

Hence, the drive assist ECU 10 computes the target curvature Cuemergency* after time t1, as shown by the thick line in FIG. 12. The target curvature Cuemergency* is computed using a maximum value (Cu max) and a maximum change gradient (Cu' max). The maximum value (Cu max) is set to the upper limit of the lateral acceleration of the vehicle that is allowed in the control system of the steering assist system. The maximum change gradient (Cu' max) means a change gradient at which the target curvature Cuemergency* is increased to the maximum Cu max and a change gradient at which the target curvature Cuemergency* is decreased from the maximum Cu max to zero. The maximum change gradient (Cu' max) is set to the upper limit that is allowed in the steering assist control system. For example, the maximum value Cu max is set to a value at which the lateral acceleration of the vehicle is 0.2 G (G: gravitational acceleration). A lateral acceleration YG to act on the vehicle can be calculated as a value (YG=$v^2$·Cu) resulting from multiplying the square ($v^2$) of the vehicle speed by the curvature (Cu). Accordingly, from this relational expression, the maximum value Cu max can be evaluated. The signs of the maximum value Cu max and the maximum change gradient Cu' max are determined by the sign of the inverse integrated value.

The drive assist ECU 10 computes the target curvature Cuemergency* with respect to the elapsed time t from the time point (time t1 in FIG. 12) when the approaching vehicle is detected, based on the magnitude of the inverse integrated value, the maximum value Cu max of the target curvature and the maximum change gradient Cu' max of the target curvature. Hereinafter, the target curvature Cuemergency* with respect to the elapsed time t is also referred to as a target curvature function Cuemergency*(t). The target curvature function Cuemergency*(t) determines the target track of the own vehicle. Accordingly, the target curvature function Cuemergency*(t) corresponds to the yaw angle return target track.

The inverse integrated value can be calculated by integrating the target curvature Cu* and inverting the sign of the integrated value, whenever the target curvature Cu* is computed during the execution of the LCA. However, in the embodiment, the inverse integrated value is calculated as follows.

The target curvature Cu* in the LCA can be expressed by the following Expression (19), using the target lateral acceleration ay* and the vehicle speed v.

$$Cu^* = ay^*/v^2 \quad (19)$$

Accordingly, the value resulting from integrating the target curvature Cu* from time t0 (that is, the elapsed time t=0) to time t1 (that is, the elapsed time t=t1) can be expressed by the following Expression (20), using the vehicle speed v and the target lateral velocity vy*. Expression (20) is based on the premise that the vehicle speed v can be regarded as being constant during the execution of the LCA.

[Formula 1]

$$\int_0^{t1} Cu^*(t)dt = \left[\frac{vy^*(t)}{v^2}\right]_0^{t1} \quad (20)$$
$$= \frac{vy^*(t1)}{v^2}$$

Accordingly, the inverse integrated value is calculated by inverting the sign of the integrated value obtained by Expression (20). As described above, when the inverse integrated value is calculated, it is possible to compute the target curvature Cuemergency* with respect to the elapsed time t from the time point when the approaching vehicle is detected, based on the magnitude of the inverse integrated value, the maximum value Cu max of the target curvature and the maximum change gradient Cu' max of the target curvature. Thus, the drive assist ECU 10 computes the target curvature Cuemergency* for returning, to zero, the integrated value of the target curvature Cu* from the start of the LCA, by the shortest time, under the limitation with the maximum value Cu max and the maximum change gradient Cu' max.

The description of the computation of the yaw angle return target track (target curvature Cuemergency*(t)) has been made above.

In step S42, at the same time as the computation of the yaw angle return target track, the drive assist ECU 10 gives a warning for informing the driver of the halfway stop of the LCA and the detection of the approaching vehicle. For example, the drive assist ECU 10 drives the buzzer 13 to generate a warning sound (for example, four beeps), and sends an LCA approach warning command to the meter ECU 30. The warning sound is given such that the attention level is highest.

Figure 13:
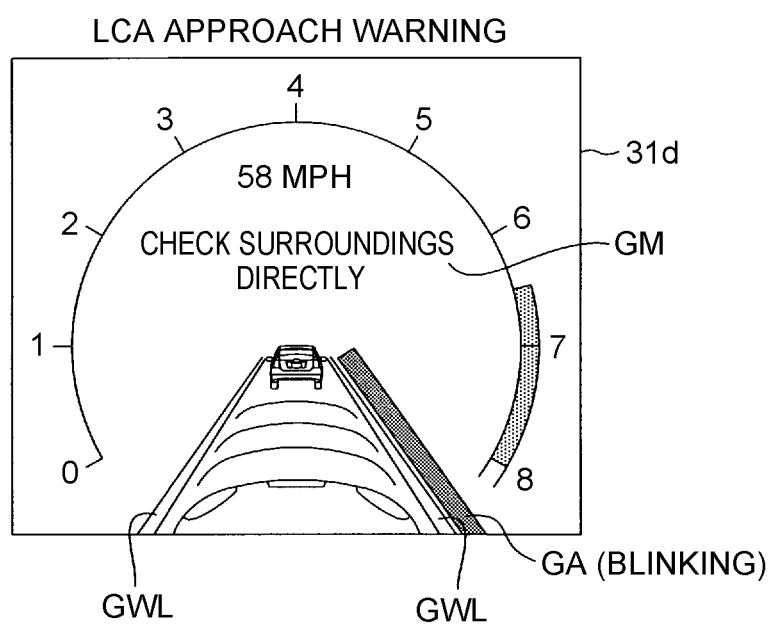
FIG. 13 shows an LCA approach warning screen on the display device.

When the meter ECU 30 receives the LCA approach warning command, the meter ECU 30 displays an LCA approach warning screen 31d on the display device 31, as shown in FIG. 13. In the LCA approach warning screen 31d, the track Z (see FIG. 8) displayed until that time is erased, and a warning mark GA is displayed so as to be blinked parallel to the white line image GWL on the side in the lane change direction (on the right side, in this example), beside the white line image GWL. By the sounding of the buzzer 13 and the LCA approach warning screen 31d displayed on the display device 31, the driver can recognize that the LCA is stopped halfway and that the other vehicle abnormally approaches the own vehicle on the target lane. In this case, a warning message may be generated by voice announcement. Further, a warning may be given to the driver by vibration of a vibrator (not illustrated). The LCA approach warning screen 31d continues to be displayed until an end condition of the LCA approach warning control state is satisfied.

Subsequently, in step S43 of the routine shown in FIG. 7, the drive assist ECU 10 performs the steering control based on the target curvature function Cuemergency*(t) calculated in the previous step S42. In this case, the drive assist ECU 10 resets the timer t (clears the timer t to zero and then starts the timer t), and computes the target curvature Cuemergency* at the current time point, from the elapsed time t from the time point when the approaching vehicle is detected in the LCA latter-part state and the target curvature function Cuemergency*(t). The drive assist ECU 10 computes the target steering angle θemergency* at the current time point, from the target curvature Cuemergency* and the curvature Cu detected by the camera sensor 12 at the current time point. The target steering angle θemergency* is calculated by multiplying the sum of the target curvature Cuemergency* at the current time point and the curvature Cu detected by the camera sensor 12, by the control gain Klca1, as shown in the following Expression (21).

$$\theta\text{emergency}^* = Klca1 \cdot (Cu\text{emergency}^* + Cu) \quad (21)$$

The drive assist ECU 10 sends a steering command indicating the target steering angle θemergency*, to the EPS ECU 20, whenever the drive assist ECU 10 calculates the target steering angle θemergency*. When the EPS ECU 20 receives the steering command, the EPS ECU 20 drives and controls the steering motor 22 such that the steering angle follows the target steering angle θemergency*. In the embodiment, the drive assist ECU 10 computes the target steering angle θemergency* as the target controlled variable. However, the drive assist ECU 10 may compute a target torque that gives the target steering angle θemergency*, and may send a steering command indicating the target torque, to the EPS ECU 20.

Hereinafter, the steering control with use of the target steering angle θemergency* is referred to as a yaw angle return control. In the yaw angle return control, the steering angle is controlled by only the feedforward control member with use of the sum of the target curvature Cuemergency* and the curvature Cu detected by the camera sensor 12. That is, a feedback control with use of the yaw angle θy detected by the camera sensor 12 is not performed.

The drive assist ECU 10 may hold the value of the feedback controlled variable (the second to fifth members on the right side of Expression (15)) computed just before the time point (time t1) when the approaching vehicle is detected, and may add the held value (fixed value) to the right side of Expression (21) as a part of the feedforward controlled variable, during the yaw angle return control.

Subsequently, in step S44, the drive assist ECU 10 determines whether the yaw angle return control is completed. The yaw angle return control is completed at the timing when the target curvature Cuemergency* becomes zero (at time t2 in FIG. 12). When the yaw angle return control is not completed, the drive assist ECU 10 returns the process to step S43, and executes the same processes. The processes are repeated in a predetermined computation cycle, and thereby, the yaw angle is decreased at a high speed.

The yaw angle is changed also in the case where the own vehicle is returned to the center position of the previous lane by the LCA cancel control. However, in the case of the yaw angle return control, the yaw angle is decreased at a higher velocity (that is, an emergency velocity) than the change velocity in the LCA cancel control, because of the setting of the maximum value Cu max of the target curvature and the maximum change gradient Cu' max.

When the yaw angle return control is completed as a result of the repeat of the processes (S44: Yes), the drive assist ECU 10 proceeds with the process to step S45. At this time point, the yaw angle has been decreased to nearly zero. That is, the lateral velocity of the own vehicle is nearly zero. Accordingly, it is possible to prevent the own vehicle from moving to the width-directional center side of the target lane, and it is possible to assist the avoidance of the collision with the approaching vehicle. A functional unit of the drive assist ECU 10 that executes the yaw angle return control (S42 to S44) may function as a collision avoidance assist control unit.

In step S45, the drive assist ECU 10 computes a target track for moving the own vehicle from the current position (the position of the own vehicle at the moment when the yaw angle return control is completed) to the center position of the previous lane. Hereinafter, the target track is referred to as a previous lane return target track. The function y(t) shown in Expression (2) is used also for the previous lane return target track. A function expressing the previous lane return target track is referred to as a previous lane return target track function y(t). In the calculation of the previous lane return target track function y(t), for determining the coefficients $c_0$, $c_1$, $c_2$, $c_3$, $c_4$, $c_5$ of the function y(t) shown in Expression (2), previous lane return target track computation parameters are set as follows. The previous lane return target track computation parameters are the following seven parameters (P21 to P27).

P21. A lateral position of the own vehicle at the current time point (the time when the yaw angle return control is completed)

P22. A lateral velocity of the own vehicle at the current time point (the time when the yaw angle return control is completed)

P23. A lateral acceleration of the own vehicle at the current time point (the time when the yaw angle return control is completed)

P24. A target lateral position (the center position of the previous lane in the embodiment; hereinafter, referred to as a previous lane return completion target lateral position) that is a target value of the lateral position for the movement of the own vehicle P25. A target lateral velocity (referred to as a previous lane return completion target lateral velocity) of the own vehicle when the own vehicle is moved to the previous lane return completion target lateral position P26. A target lateral acceleration (referred to as a previous lane return completion target lateral acceleration) of the own vehicle when the own vehicle is moved to the previous lane return completion target lateral position P27. A target time (referred to as a previous lane return target time) that is a target value of a time necessary to move the own vehicle from the current position to the previous lane return completion target lateral position Here, the lateral position of the own vehicle at the current time point (the time when the yaw angle return control is completed) is represented by yreturn, the lateral velocity at the current time point is represented by vyreturn, the lateral acceleration at the current time point is represented by ayreturn, the time when the yaw angle return control is completed is newly set to t=0, and the previous lane return target time is represented by treturn. The previous lane return target track computation parameters are set to y(0)=yreturn, y'(0)=vyreturn, y"(0)=ayreturn, y(treturn)=W (the sign is set depending on the lane change direction), y'(treturn)=0, and y"(treturn)=0.

The lateral position yreturn, the lateral velocity vyreturn and the lateral acceleration ayreturn are detection values at the current time point, and can be computed by the same method as the above-described method for evaluating the initial lateral state amount. That is, the lateral position yreturn is the lateral deviation Dy at the current time point. The lateral velocity vyreturn is evaluated from the vehicle speed v at the current time point and the yaw angle θy at the current time point (vyreturn=v·sin(θy)). The lateral acceleration ayreturn is a value (v·γ) resulting from multiplying the yaw rate γ at the current time point by the vehicle speed v at the current time point. Further, y(treturn) is set to the previous lane return completion target lateral position, that is, the center position of the previous lane. On this occasion, in the case where the camera sensor 12 outputs the lane information about the previous lane at the time point when the yaw angle return control is completed, y(treturn) is set to zero. Both y'(treturn), which expresses the previous lane return completion target lateral velocity, and y"(treturn), which expresses the previous lane return completion target lateral acceleration, are set to zero.

The previous lane return target time treturn is computed by the following Expression (22), using a target time setting constant Areturn set to a similar value to the target time setting constant A that is used when the target lane change time tlen is computed at the start of the LCA.

$$treturn = Dreturn \cdot Areturn \qquad (22)$$

Here, Dreturn is a necessary distance for moving the own vehicle in the lateral direction from the lateral position of the own vehicle at the time when the yaw angle return control is completed to the previous lane return completion target lateral position (the center position of the previous lane). At the time point when the yaw angle return control is completed, the collision with the other vehicle is avoided. Therefore, the velocity of the position movement of the own vehicle in the lateral direction may be similar to that in the LCA. Accordingly, the target time setting constant Areturn is set to a similar value to the target time setting constant A in the execution of the LCA.

Based on the setting values of the previous lane return target track computation parameters, the drive assist ECU 10 calculates the values of the coefficients $c_0$, $c_1$, $c_2$, $c_3$, $c_4$, $c_5$ of the function y(t) expressed by Expression (2), by the same method as step S14. Then, the drive assist ECU 10 substitutes the calculated values of the coefficients $c_0$, $c_1$, $c_2$, $c_3$, $c_4$, $c_5$ into Expression (2), and thereby, calculates the previous lane return target track function y(t).

After the drive assist ECU 10 calculates the previous lane return target track function in step S45, the drive assist ECU 10 proceeds with the process to step S46. In step S46, the drive assist ECU 10 performs the steering control based on the previous lane return target track function calculated in the previous step S45. In this case, the drive assist ECU 10 resets the timer t (clears the timer t to zero and then starts the timer t), and computes the target lateral motion state amount (y*, vy*, ay*) and the target yaw state amount (θy*, γ*, Cu*) from the elapsed time t from the time point when the yaw angle return control is completed and the previous lane return target track function y(t), similarly to step S15, to compute a final target steering angle θreturn*. For example, the target steering angle θreturn* can be computed, by replacing the left side of Expression (15) with θreturn*.

After the drive assist ECU 10 computes the target controlled variable (target steering angle θreturn*), the drive assist ECU 10 sends the steering command indicating the target controlled variable, to the EPS ECU 20. In the embodiment, the drive assist ECU 10 computes the target steering angle θreturn* as the target controlled variable. However, the drive assist ECU 10 may compute a target torque that gives the target steering angle θreturn*, and may send the steering command indicating the target torque, to the EPS ECU 20.

Subsequently, in step S47, the drive assist ECU 10 determines whether an end condition of the LCA approach warning control state is satisfied. In this case, the drive assist ECU 10 determines that the end condition of the LCA approach warning control state is satisfied, when the drive assist ECU 10 detects that the lateral position of the own vehicle has reached the previous lane return completion target lateral position (the center position of the previous lane) by the steering control in step S46. Alternatively, the drive assist ECU 10 may determine that the end condition of the LCA approach warning control state is satisfied, when the drive assist ECU 10 detects that the LCA approach warning control state is continued for a certain preset time.

In the case where the drive assist ECU 10 determines that the end condition of the LCA approach warning control state is not satisfied (S47: No), the drive assist ECU 10 returns the process to step S46. Accordingly, the steering control in step S46 is executed until the end condition of the LCA approach warning control state is satisfied. Thereby, the own vehicle travels toward the center position of the previous lane.

When the end condition of the LCA approach warning control state is satisfied as a result of the repeat of the processes, the drive assist ECU 10 ends the LCA approach warning control routine, and proceeds with the process to step S21 of the main routine (steering assist control routine). Thereby, the steering assist control state is switched from the LCA approach warning control state to the LTA-ON state. A functional unit of the drive assist ECU 10 that executes the processes of step S45 to step S47 may function as a previous lane return assist control unit.

Figure 15:
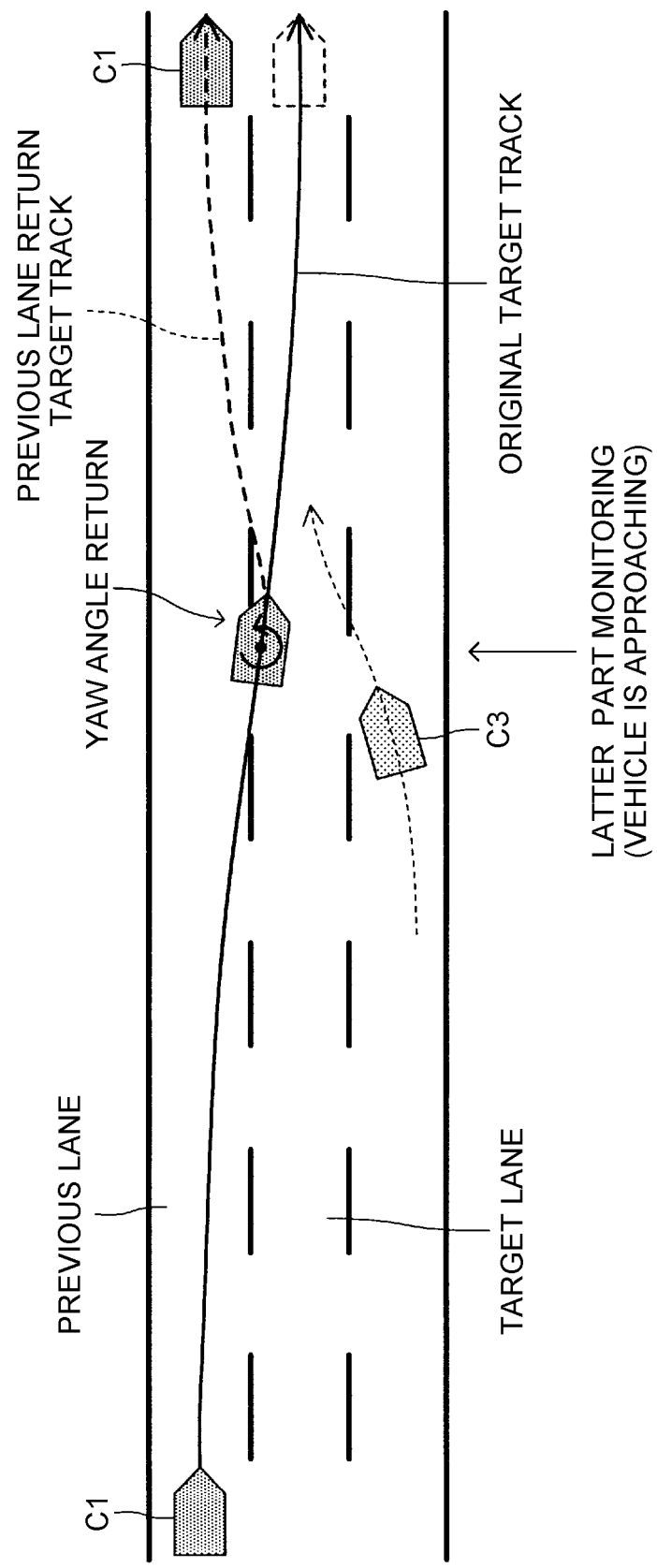
FIG. 15 is a diagram showing a target track and a previous lane return target track.

FIG. 15 shows a previous lane return target track when the own vehicle C1 and the other vehicle C3 approach each other in the LCA latter-part state.

In the above-described steering assist system in the embodiment, even after the LCA is started based on the periphery monitoring, the periphery monitoring is continued. In the case where the approaching vehicle is detected, the LCA is stopped halfway, and the mode of the steering assist control after that time is switched depending on the progress status of the lane change at that time. In the case where the approaching vehicle is detected in the former part of the lane change, the steering control is assisted such that the own vehicle is returned to the center position of the previous lane in the lane width direction of the previous lane. Thereby, while safety is secured, the own vehicle is returned to a preferable position for the driver. Accordingly, it is possible to increase convenience.

In the case where the approaching vehicle is detected in the latter part of the lane change, the approach warning is given to the driver, and the steering angle is controlled such that the yaw angle of the own vehicle is quickly returned to the state just before the start of the LCA. Just before the start of the LCA, the LTA is being executed. Therefore, the yaw angle is decreased to nearly zero. Further, in the yaw angle return control, the steering angle is controlled by only the feedforward control, using the target steering angle θemergency* computed based on the integrated value of the target curvature Cu*.

The yaw angle return control needs to be performed in as short a time as possible. For example, in the case where the steering angle is quickly changed using the detection value of the camera sensor 12 and where the detection value of the camera sensor 12 is wrong, the steering angle is quickly changed in a wrong direction, and an uncomfortable feeling is given to the driver. In the case where the feedback control is executed using the yaw angle θy detected by the camera sensor 12, the target controlled variable is set with the detection of the change in behavior of the vehicle, and therefore, the control delay is generated. Hence, in the embodiment, the yaw angle is returned to the state just before the start of the LCA, by the feedforward control based on the integrated value of the target curvature Cu*, and thereby, it is possible to quickly decrease the yaw angle to zero. Thereby, it is possible to decrease the lateral velocity of the own vehicle in a short time. Accordingly, it is possible to quickly prevent the own vehicle from moving to the width-directional center side of the target lane, and it is possible to assist the avoidance of the collision with the approaching vehicle (to assist the decrease in probability of the collision). The feedforward controlled variable includes the component (Klca1·Cu) of the curvature Cu indicating the curve form of the road. However, the component is a controlled variable for making the own vehicle travel along the form of the road, and the change in the component is extremely gentle. Therefore, the component has no bad influence on the yaw angle return control.

When the yaw angle return control is completed, the previous lane return target track for returning the own vehicle to the center position of the previous lane is computed, and the steering angle is controlled such that the own vehicle moves along the previous lane return target track. Accordingly, it is possible to return the own vehicle to a position that is further safe and that is preferable for the driver.

As for the threshold of the collision time TTC that is used for the determination of whether a vehicle is approaching, the latter-part threshold TTC2 is set to a smaller value than the former-part threshold TTC1. Therefore, in the LCA former-part state, it is possible to end the LCA with enough time in the state where safety is secured, in the case of detecting the other vehicle that is likely to abnormally approach the own vehicle. On the other hand, in the LCA latter-part state, it is possible to prevent an emergency operation assist for collision avoidance from being performed more than necessary. Accordingly, it is possible to prevent the LCA from being stopped halfway more than necessary, and it is possible to increase convenience.

The determination of the former part and latter part of the lane change is performed based on the lateral deviation Dy that is detected by the camera sensor 12, and can be executed properly and easily. By switching the progress status of the lane change between the former part and latter part of the lane change at an earlier timing before the side surface of the own vehicle passes through the boundary white line in consideration of the overshoot (the lateral directional distance by which the own vehicle enters the target lane) due to the delay in response in the LCA cancel control, it is possible to perform the switching between the LCA cancel control state and the LCA approach warning control state more properly. Particularly, by setting a former-latter part switching position (former-latter part determination condition) in consideration of the lateral velocity of the own vehicle, it is possible to perform the switching between the LCA cancel control state and the LCA approach warning control state further properly.

At the time of the end of the LCA cancel control state and the time of the end of the LCA approach warning control state, similarly to the time of the completion of the LCA, the target lateral velocity and the target lateral acceleration of the own vehicle are set to zero, and therefore, the own vehicle can stably travel along the lane center line CL continuously.

Modification 1

In the embodiment, in the yaw angle return control, the control of returning the yaw angle to the state just before the start of the LCA is performed by using the inverse integrated value. However, it is not always necessary to use the inverse integrated value. For example, in step S42 of the routine shown in FIG. 7, the drive assist ECU 10 computes the target steering angle for decreasing the yaw angle (absolute value), with a maximum steering angle that is allowed in the steering assist system. In this case, similarly to the above embodiment, the drive assist ECU 10 may compute the target steering angle, based on the maximum value Cu max of the target curvature and the maximum change gradient Cu' max of the target curvature. In step S43, the drive assist ECU 10 sends a steering command indicating the target steering angle, to the EPS ECU 20.

Then, in step S44, the drive assist ECU 10 determines whether the yaw angle θy to be detected by the camera sensor 12 has become zero, or whether the sign (positive or negative) of the yaw angle θy has been inverted. When the yaw angle θy has become zero, or when the sign of the yaw angle θy has been inverted, the drive assist ECU 10 determines that the yaw angle return is completed (S44: Yes). It is preferable to apply the modification 1 in the case where the camera sensor 12 with a high definition is equipped.

Modification 2

In the above embodiment and modification 1, in the case of executing the yaw angle return control, the drive assist ECU 10 controls the steering angle to decrease the yaw angle at the emergency velocity. However, it is not always necessary to control the steering angle. The drive assist ECU 10 may generate a braking force difference between right and left wheels such that the own vehicle performs a yaw motion, and thereby, may decrease the yaw angle at the emergency velocity. For example, the drive assist ECU 10 may execute the following process, instead of the processes of the steps S42 to S44 shown in FIG. 7.

When the drive assist ECU 10 sets the steering assist control state to the LCA approach warning control state (S41), the drive assist ECU 10 sends a yaw angle return control command to the brake ECU 60, and gives the warning to the driver. The warning to the driver is the same as the process of step S42 in the embodiment. The yaw angle return control command includes information about the direction of the return of the yaw angle. The brake ECU 60 generates a braking force difference between the right and left wheels, based on the yaw angle return control command. In this case, the brake ECU 60 may generate braking force for both of the right and left wheels, or may generate braking force for at least one of the right and left wheels. Thereby, the own vehicle performs the yaw motion such that the yaw angle (absolute value) is decreased. The braking force is controlled with a controlled variable set for the yaw angle return control, that is, a controlled variable that allows the yaw angle to be decreased at an emergency velocity for collision avoidance.

After the drive assist ECU 10 sends the yaw angle return control command, the drive assist ECU 10 determines whether the yaw angle θy to be detected by the camera sensor 12 has become zero, that is, whether the sign (positive or negative) of the yaw angle θy has been inverted. When the yaw angle θy has become zero, or when the sign of the yaw angle θy has been inverted, the drive assist ECU 10 stops the sending of the yaw angle return control command to the brake ECU 60. Thereby, the braking force is lost, and the yaw angle return control is ended. After the drive assist ECU 10 stops the sending of the yaw angle return control command, the drive assist ECU 10 proceeds with the process to step S45.

Also in the modification 2, it is possible to quickly decrease the yaw angle of the own vehicle. Similarly to the modification 1, it is preferable to apply the modification 2 in the case where the camera sensor 12 with a high definition is equipped. It is allowable to adopt a configuration of concurrently executing both the control of the braking force and the control of the steering angle (for example, the modification 1).

Modification 3

The LCA approach warning control routine (S40) in the embodiment is divided into the yaw angle return control (S42 to S44) and the control process (S45 to S47) for returning the own vehicle to the previous lane, but can be executed without the division into them. For example, in the LCA approach warning control routine (S40), the processes of steps S42 to S44 are excluded. Instead, a technique of setting the previous lane return target time treturn to a short time for collision avoidance in the computation of the previous lane return target track in step S45. Here, the warning process to the driver in step S42 is executed.

In this case, in step S45, the drive assist ECU 10 sets the seven previous lane return target track computation parameters (P21 to P27). The parameters P21, P22, P23 are set to the lateral position (P21), lateral velocity (P22) and lateral acceleration (P23) of the own vehicle when the steering assist control state is set to the LCA approach warning control state, respectively. The other parameters P24 to P27 are set in the same way as the embodiment.

Here, the lateral position of the own vehicle at the current time point (the time when the LCA approach warning control state is set) is represented by yreturn, the lateral velocity of the own vehicle at the current time point is represented by vyreturn, the lateral acceleration of the own vehicle at the current time point is represented by ayreturn, the time when the steering assist control state is set to the LCA approach warning control state is newly set to t=0, and the previous lane return target time is represented by treturn. The previous lane return target track computation parameters are set to y(0)=yreturn, y'(0)=vyreturn, y''(0)=ayreturn, y(treturn)=W (the sign is set depending on the lane change direction), y'(treturn)=0, and y''(treturn)=0.

The lateral position yreturn, the lateral velocity vyreturn and the lateral acceleration ayreturn are detection values at the current time point, and can be computed by the same method as the above-described method for evaluating the initial lateral state amount. Further, y(treturn) is set to the previous lane return completion target lateral position, that is, the center position of the previous lane. On this occasion, in the case where the camera sensor 12 outputs the lane information about the previous lane at the time point when the steering assist control state is set to the LCA approach warning control state, y(treturn) is set to zero. Both y'(treturn), which expresses the previous lane return completion target lateral velocity, and y"(treturn), which expresses the previous lane return completion target lateral acceleration, are set to zero.

The previous lane return target time treturn of the parameter P27 needs to be set to a short time for collision avoidance. Therefore, the previous lane return target time treturn is computed by the above Expression (22), using a target time setting constant Areturn set for collision avoidance. Accordingly, the target time setting constant Areturn is set to a smaller value than the target time setting constant Acancel that is used in the LCA cancel control. Further, Dreturn in Expression (22) is a distance necessary for moving the own vehicle in the lateral direction from the lateral position of the own vehicle at the time when the steering assist control state is set to the LCA approach warning control state to the previous lane return completion target lateral position (the center position of the previous lane).

Based on the setting values of the previous lane return target track computation parameters, the drive assist ECU 10 calculates the values of the coefficients $c_0$, $c_1$, $c_2$, $c_3$, $c_4$, $c_5$ of the function y(t) expressed by Expression (2), by the same method as step S14. Then, the drive assist ECU 10 substitutes the calculated values of the coefficients $c_0$, $c_1$, $c_2$, $c_3$, $c_4$, $c_5$ into Expression (2), and thereby, calculates the previous lane return target track function y(t). After the drive assist ECU 10 calculates the previous lane return target track function in step S45, the drive assist ECU 10 proceeds with the process to step S46.

Also in the modification 3, it is possible to quickly decrease the yaw angle of the own vehicle, in the case where the approaching vehicle is detected in the latter part of the lane change.

Modification 4

In the embodiment, the warning (S42) to the driver and the steering assist (S42, S43) for collision avoidance are concurrently started, in the case where the steering assist control state is set to the LCA approach warning control state. Instead, the warning to the driver may be first executed, and the driver may be prompted to perform the wheel operation. Thereafter, in the case where the degree of the approach between the own vehicle and the other vehicle becomes further higher, the LCA may be ended, and the LCA approach warning control may be started.

Figure 17:
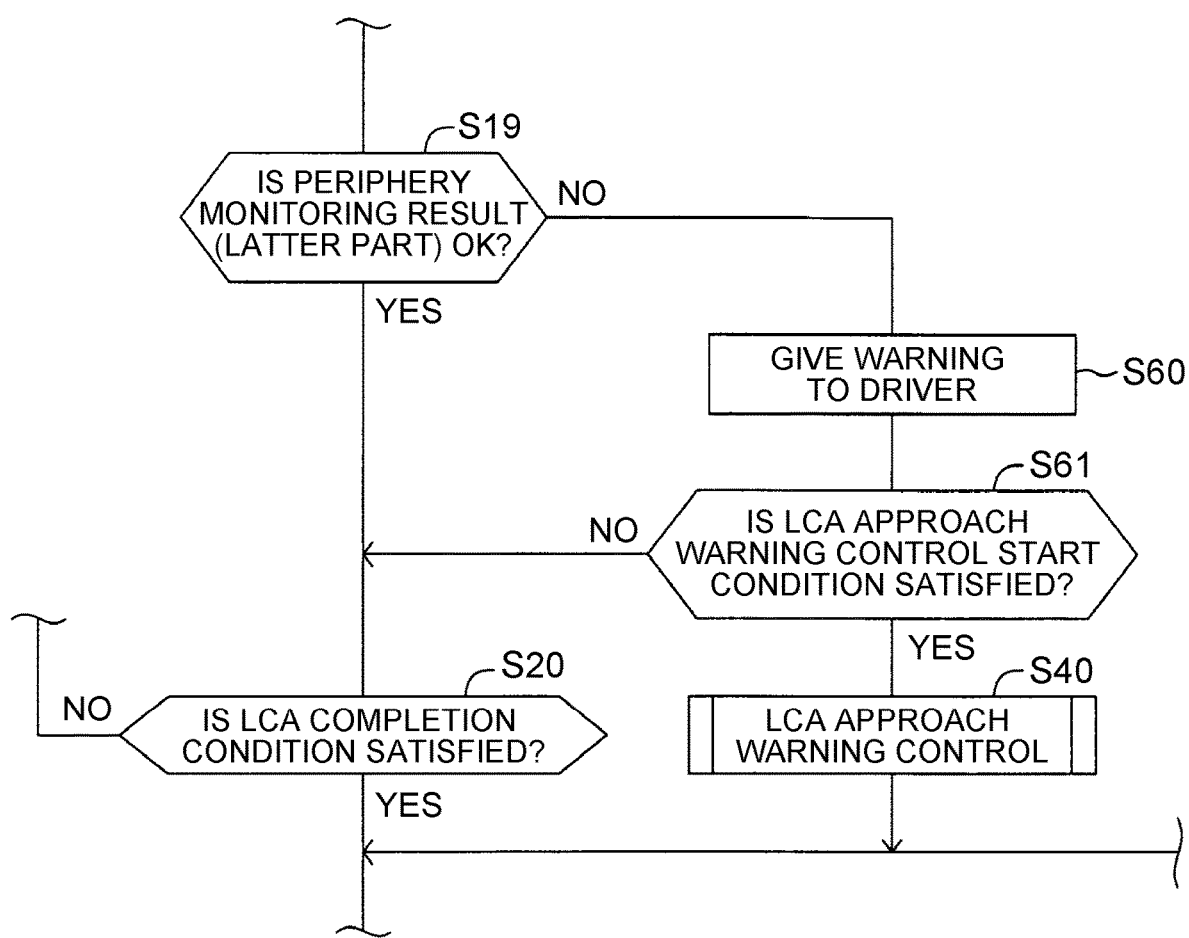
FIG. 17 is a flowchart showing a steering assist control routine according to a modification.

FIG. 17 shows a modification (modified part) of the steering assist control routine. When the drive assist ECU 10 makes the determination of "a vehicle is approaching" in step S19 (S19: No), the drive assist ECU 10 gives the warning to the driver in step S60. Subsequently, in step S61, the drive assist ECU 10 determines whether the condition for the start of the LCA approach warning control is satisfied. In this case, the drive assist ECU 10 determines whether the collision time TTC is less than a threshold TTCsteer. For example, the threshold TTCsteer is set to a smaller value than the latter-part threshold TTC2 in step S19. In the case where the collision time TTC is equal to or more than the threshold TTC steer, the drive assist ECU 10 proceeds with the process to step S20. On the other hand, in the case where the collision time TTC is less than the threshold TTCsteer, the drive assist ECU 10 proceeds with the process to step S40. In the modification, it is possible to further increase convenience.

The steering assist systems according to the embodiment and the modifications have been described above. However, the disclosure is not limited to the embodiment and modifications, and various alterations can be made without departing from the spirit of the disclosure.

For example, in the above embodiment, the final target lateral position is set to the center position of the previous lane, in the LCA approach warning control state. However, the final target lateral position does not always need to be set to the center position of the previous lane, and for example, may be set to an arbitrary lateral position in the previous lane.

Further, in the above embodiment, the determination of the former part and latter part of the lane change may be performed based on the lateral deviation Dy detected by the camera sensor 12, but instead, may be performed based on the elapsed time from the start of the LCA. For example, a time (the elapsed time from the start of the LCA) in which the lateral position of the own vehicle reaches a particular position may be set as a determination time, and whether the progress status of the lane change is the former part or the latter part may be determined based on whether the elapsed time from the start of the LCA has reached the determination time.

In the above embodiment, the execution of the LCA is based on the premise that the steering assist control state is the LTA-ON state (the state where the LTA is being executed), but the premise is not always necessary. Further, the premise that the ACC is being executed is not necessary. Further, in the embodiment, the LCA is executed with the condition that the road on which the own vehicle travels is an expressway. However, it is not always necessary to provide the condition.

In the above embodiment, the lane is recognized by the camera sensor 12. However, the positional relation of the own vehicle relative to the lane may be detected by the navigation ECU 70.

After the collision avoidance assist control is executed, another steering assist control of assisting a steering operation for moving the own vehicle to a desired position may be appropriately executed.

The decrease in the yaw angle means the decrease in the absolute value of the yaw angle. In the case where the yaw angle is decreased at the emergency velocity, the steering, for example, may be controlled such that the yaw angle is decreased, with a maximum steering angle that is allowed in the steering assist system. Further, for example, the yaw angle can be decreased by controlling the orientation of the own vehicle using braking power of a wheel. The "decrease at the emergency velocity that is higher than the velocity at which the yaw angle is changed by the center return assist control" means the decrease at the emergency velocity that is higher than the velocity at which the yaw angle is changed by the center return assist control, for example, with respect to average velocity, instead of meaning a momentary velocity at a certain time. Accordingly, it is possible to decrease a lateral velocity that is the velocity of the own vehicle in the lane width direction, in a short time. When the lane change assist control is started, the yaw angle is increased for making the own vehicle travel toward the target lane. The collision avoidance assist control controls the steering such that the yaw angle increased by the lane change assist control is returned to the yaw angle just before the lane change assist control is started quickly (at the emergency velocity).

While the lane tracing assist control is being executed, the regular position in the lane width direction may be the center position in the lane width direction, for example. When the lane change assist control is started, it is estimated that the yaw angle is a value close to zero.

The change in the target curvature corresponds to the change in the steering angle, and can be regarded as the change in the yaw angle. This means that it is possible to adjust the yaw angle to a value close to the value just before the lane change assist control is started, by controlling the steering so as to adjust, to zero, the integrated value of the target curvature that changes with time from the start of the lane change assist control. Hence, the value corresponding to the integrated value of the target curvature from the start of the lane change assist control to the start of the collision avoidance assist control is calculated, and the target controlled variable based on the value corresponding to the computed integrated value is calculated. Then, the steering is controlled based on the target controlled variable. For example, the target controlled variable can be calculated based on a value resulting from inverting the sign of the integrated value of the target curvature. The integrated value of the target curvature can be evaluated by integrating the target curvature, and the integrated value of the target curvature can be evaluated, for example, by calculating a value resulting from dividing the lateral velocity (a target lateral velocity for control may be adopted) of the own vehicle when the lane change assist control is stopped by the square of vehicle speed. The yaw angle just before the lane change assist control is started is a value close to zero. Accordingly, it is possible to adjust the orientation of the own vehicle to an orientation close to the direction in which the lane extends, in a short time.

The detection of the progress status and the determination of the former part and the latter part can be performed by detecting the relative position of the own vehicle to the lane based on the lane information, or can be performed by estimating the relative position of the own vehicle to the lane based on an elapsed time from the start of the lane change assist control.

Also, even in the case where the approaching vehicle is detected and the center return assist control is started when the own vehicle is positioned on the previous lane, the yaw angle does not become a value close to zero immediately (that is, there are a control delay and the like), and therefore, the own vehicle goes in the lane change direction to some extent. That is, the lateral position of the own vehicle overshoots in the lane change direction at the start of the center return assist control. Hence, the determination of the former part and the latter part may be performed while an overshoot amount (a lateral movement distance when the own vehicle moves in the lane change direction) is previously forecasted. That is, the progress status of the lane change may be switched from the former part to the latter part early, before a side part of the own vehicle on the lane change side reaches the boundary between the previous lane and the target lane.

The overshoot due to the delay of the center return assist control is larger as the velocity of the own vehicle in the lane width direction is higher. Hence, the determination position may be set such that the distance between the boundary and the determination position is larger as the velocity of the own vehicle in the lane width direction is higher.

What is claimed is:

1. A steering assist system comprising:
a first sensor configured to monitor a periphery of an own vehicle;
a second sensor configured to
recognize a lane, and
acquire lane information including a positional relation of the own vehicle relative to the lane; and
an electronic control unit configured to
start a lane change assist control in response to a lane change assist request, in a case where the first sensor does not detect another vehicle obstructing a lane change performed by the own vehicle, the lane change assist control controlling steering such that the own vehicle performs the lane change, based on the lane information, from a previous lane to a target lane, the previous lane being a lane on which the own vehicle is currently traveling, the target lane being a lane adjacent to the previous lane,
detect a progress status of the lane change by the lane change assist control at a current time point,
stop the lane change assist control halfway, when the first sensor detects an approaching vehicle, that the approaching vehicle being likely to abnormally approach the own vehicle in a case where the lane change assist control is continued,
execute a center return assist control in a case where the progress status when the approaching vehicle is detected and the lane change assist control is stopped halfway is a former part of the lane change, the center return assist control controlling the steering such that the own vehicle is moved to a center position of the previous lane in a lane width direction of the previous lane, and
execute a collision avoidance assist control in a case where the progress status when the approaching vehicle is detected and the lane change assist control is stopped halfway is a latter part of the lane change, the collision avoidance assist control controlling an orientation of the own vehicle such that a yaw angle is decreased at an emergency velocity, the yaw angle being an angle between a direction in which the lane extends and an orientation direction of the own vehicle, the emergency velocity being higher than a velocity at which the yaw angle is changed by the center return assist control.

2. The steering assist system according to claim 1, wherein
the electronic control unit is configured to
execute a lane tracing assist control, the lane tracing assist control controlling the steering such that a traveling position of the own vehicle is kept at a regular position in the lane width direction in the lane based on the lane information,
stop the lane tracing assist control start the lane change assist control, in a case where the lane change assist request is received while the lane tracing assist control is being executed, and
control the steering such that the yaw angle increased by the lane change assist control is returned to a previous yaw angle immediately before the lane change assist control is started.

3. The steering assist system according to claim 2, wherein
the electronic control unit is configured to
compute a first target controlled variable in a predetermined computation cycle, the first target controlled variable including a feedforward controlled variable in which a target curvature of a track in which the own vehicle performs the lane change is used,
control the steering based on the first target controlled variable,
compute a value corresponding to an integrated value of the target curvature from start of the lane change assist control to start of the collision avoidance assist control,
compute a second target controlled variable based on the value corresponding to the integrated value, and control the steering based on the second target controlled variable while the collision avoidance assist control is executed.

4. The steering assist system according to claim 1, wherein
the electronic control unit is configured to execute a previous lane return assist control after the collision avoidance assist control is completed, the previous lane return assist control controlling the steering such that the own vehicle is moved to the center position of the previous lane in the lane width direction of the previous lane.

5. The steering assist system according to claim 1, wherein
the electronic control unit is configured to
determine whether the progress status of the lane change by the lane change assist control at the current time point is the former part of the lane change or the latter part of the lane change,
determine that the progress status is the former part of the lane change in a case where it is estimated that the own vehicle is positioned in the previous lane, and
determine that the progress status is the latter part of the lane change in a case where it is estimated that at least a part of the own vehicle is positioned in the target lane.

6. The steering assist system according to claim 1, wherein
the electronic control unit is configured to
determine whether the progress status of the lane change by the lane change assist control at the current time point is the former part of the lane change or the latter part of the lane change,
determine that the progress status is the former part of the lane change in a case where it is estimated that the own vehicle is positioned in a first area that is on an opposite side of a determination position from the target lane in a lane change direction, and
determine that the progress status is the latter part of the lane change in a case where it is estimated that the own vehicle is positioned in a second area that is on an opposite side of the determination position from the first area in the lane change direction,
the determination position being a particular position located between the center position of the previous lane in the lane width direction of the previous lane and a boundary, the boundary being between the previous lane and the target lane.

7. The steering assist system according to claim 6, wherein
the electronic control unit is configured to set the determination position such that a distance between the boundary and the determination position is longer as a velocity of the own vehicle in the lane width direction is higher.

8. The steering assist system according to claim 1, wherein
the electronic control unit is configured to determine that the approaching vehicle is detected, when an approach degree of another vehicle to the own vehicle exceeds a threshold, and the threshold is set to a value corresponding to a higher approach degree in the latter part of the lane change than in the former part of the lane change.

9. The steering assist system according to claim 1, wherein the electronic control unit is further configured to set a determination position between the center position of the previous lane and a center position of the target lane,
wherein the former part of the lane change transitions to the latter part of the lane change when a center of gravity of the own vehicle crosses the determination position.

10. The steering assist system according to claim 1, wherein the latter part of the lane change begins when the own vehicle enters the target lane.

11. A steering assist system comprising:
a first sensor configured to monitor a periphery of an own vehicle;
a second sensor configured to
recognize a lane, and
acquire lane information including a positional relation of the own vehicle relative to the lane; and
an electronic control unit configured to
start a lane change assist control in response to a lane change assist request, in a case where the first sensor does not detect another vehicle obstructing a lane change performed by the own vehicle, the lane change assist control controlling steering such that the own vehicle performs the lane change, based on the lane information, from a previous lane to a target lane, the previous lane being a lane on which the own vehicle is currently traveling, the target lane being a lane adjacent to the previous lane,
detect a position of a center of gravity of the own vehicle a current time point,
stop the lane change assist control prematurely, when the first sensor detects an approaching vehicle having a trajectory that will collide with the own vehicle in a case where the lane change assist control is continued,
execute a center return assist control in a case before the position of the center of gravity of the own vehicle, when the approaching vehicle is detected and the lane change assist control is stopped prematurely, has crossed a determination position between a center position of the previous lane and a center position of the target lane, the center return assist control controlling the steering such that the own vehicle is moved to the center position of the previous lane in a lane width direction of the previous lane, and
execute a collision avoidance assist control in a case after the position of the center of gravity of the own vehicle, when the approaching vehicle is detected and the lane change assist control is stopped before completion, has crossed the determination position between a center position of the previous lane and a center position of the target lane, the collision avoidance assist control controlling an orientation of the own vehicle such that a yaw angle is decreased at an emergency velocity, the yaw angle being an angle between a direction in which the lane extends and an orientation direction of the own vehicle, the emergency velocity being higher than a velocity at which the yaw angle is changed by the center return assist control.

* * * * *